United States Patent
Makaram et al.

(10) Patent No.: US 12,549,331 B2
(45) Date of Patent: Feb. 10, 2026

(54) MEMORY BUS INTEGRITY AND DATA ENCRYPTION (IDE)

(71) Applicant: Intel Corporation, Santa Clara, CA (US)

(72) Inventors: Raghunandan Makaram, Northborough, MA (US); Kirk S. Yap, Westborough, MA (US); Rajat Agarwal, Portland, OR (US); George Vergis, Portland, OR (US); Bill Nale, Livermore, CA (US); Jacob Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 17/359,152

(22) Filed: Jun. 25, 2021

(65) Prior Publication Data

US 2021/0336767 A1    Oct. 28, 2021

(51) Int. Cl.
| | |
|---|---|
| *H04L 29/06* | (2006.01) |
| *G11C 29/12* | (2006.01) |
| *G11C 29/42* | (2006.01) |
| *H04L 9/06* | (2006.01) |
| *H04L 9/08* | (2006.01) |
| *H04L 9/32* | (2006.01) |

(52) U.S. Cl.
CPC ...... *H04L 9/0631* (2013.01); *G11C 29/12015* (2013.01); *G11C 29/42* (2013.01); *H04L 9/0637* (2013.01); *H04L 9/0838* (2013.01); *H04L 9/3242* (2013.01)

(58) Field of Classification Search
CPC ... H04L 9/0631; H04L 9/0637; H04L 9/0838; H04L 9/3242; H04L 63/12; H04L 63/123; G11C 29/12015; G11C 29/42; G06F 21/64; G06F 21/645
See application file for complete search history.

(56) References Cited

U.S. PATENT DOCUMENTS

2016/0085653 A1* 3/2016 Li ................... G06F 11/1076
                                            714/6.3
2017/0147432 A1* 5/2017 Suh ................... G06F 3/0679
(Continued)

FOREIGN PATENT DOCUMENTS

EP          3709562 A1      9/2020

OTHER PUBLICATIONS

Extended European Search Report for Patent Application No. 22161815.0, Mailed Aug. 8, 2022, 12 pages.
(Continued)

*Primary Examiner* — Malcolm Cribbs
(74) *Attorney, Agent, or Firm* — Compass IP Law PC

(57) ABSTRACT

A memory subsystem includes link encryption for the system memory data bus. The memory controller can provide encryption for data at rest and link protection. The memory controller can optionally provide link encryption. Thus, the system can provide link protection for the data in transit. The memory module can include a link decryption engine that can decrypt link encryption if it is used, and performs a link integrity check with a link integrity tag associated with the link protection. The memory devices can then store the encrypted protected data and ECC data from the link decryption engine after link protection verification.

18 Claims, 14 Drawing Sheets

(56) References Cited

U.S. PATENT DOCUMENTS

| | | |
|---|---|---|
| 2019/0043600 A1 | 2/2019 | Saileshwar et al. |
| 2020/0035321 A1 | 1/2020 | Berke et al. |
| 2020/0052892 A1* | 2/2020 | Chhabra ............... H04L 9/0631 |
| 2020/0242258 A1 | 7/2020 | Smith et al. |
| 2020/0296099 A1 | 9/2020 | Shanbhogue et al. |
| 2021/0319143 A1 | 10/2021 | Chhabra et al. |
| 2022/0207194 A1 | 6/2022 | Chhabra et al. |

OTHER PUBLICATIONS

Gunsch, Michael, "Persistent RAM: NVDIMM-P is now a JEDEC standard", https://www.computerbase.de/2021-02/nvdimm-p-jedec-standard/, Feb. 18, 2021, 4 pages.

Intel, "Intel® Architecture Memory Encryption Technologies Specification", Revision 1.3, Apr. 2021, 33 pages.

* cited by examiner

MEMORY BUS INTEGRITY AND DATA ENCRYPTION (IDE)

FIELD

Descriptions are generally related to memory systems, and more particular descriptions are related to data bus integrity and encryption.

BACKGROUND

System security continues to increase in importance to protect the operation of computing devices. Operational system data is typically stored in volatile memory, such as dynamic random access memory (DRAM) devices, with data exchange between the memory and the computational resources, such as central processing units (CPUs) and graphics processing units (GPUs). Attacks on data at rest in the memory can be impeded by data encryption of the data stored in the memory devices.

However, physical attacks on the links between the memory and the processing hardware are increasingly, which can have a negative impact on the confidentiality, integrity, and replay protection of data stored in memory. Data at rest encryption can provide some protection of the data in transit but does not offer significant replay protection.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
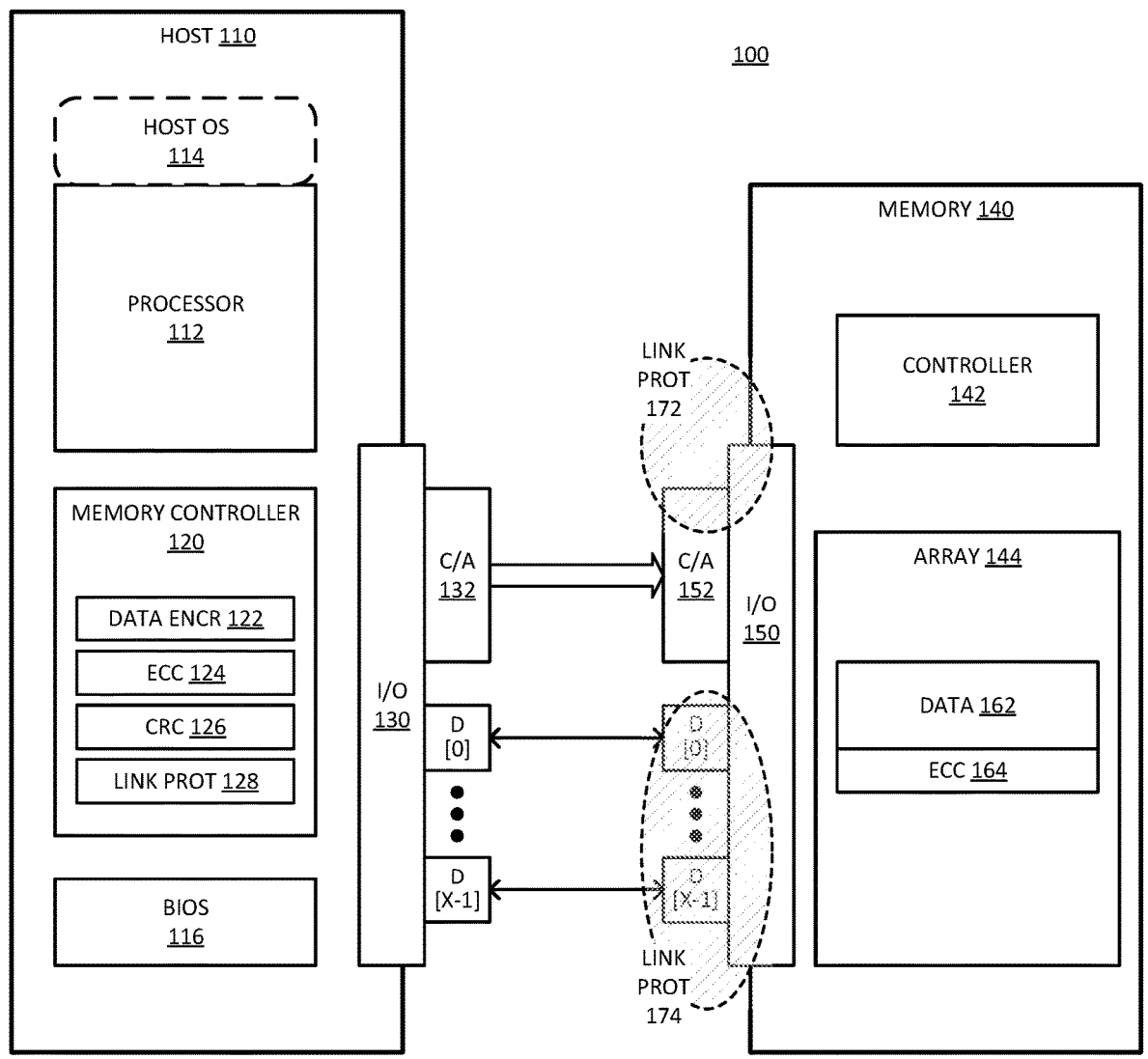
FIG. 1 is a block diagram of an example of a system in which system memory data is exchanged with link protection.

Descriptions of certain details and implementations follow, including non-limiting descriptions of the figures, which may depict some or all examples, and well as other potential implementations.

DETAILED DESCRIPTION

As described herein, a memory subsystem includes link encryption for the system memory data bus. In one example, the memory controller provides link protection as well as providing encryption for data at rest. When data at rest encryption is provided, the data in transit on a link protected link is also encrypted. In one example, the system can provide encryption for data at rest and can provide encryption for the data in transit. The use of link protection and link encryption can provide confidentiality, integrity, and replay protection without adding significant overhead to performance, power, or memory footprint.

An application of multikey total memory encryption (MKTME) can provide data at rest protection, with a memory encryption engine (MEE) used to provide a tree of counters (a Merkel tree) maintained in memory. The application of MKTME traditionally uses bits that would normally be used for ECC, which reduces the ECC protection due to having fewer bits available for ECC protection. Additionally, the use of a tree of counters sufficient to cover all memory at server scales would require maintaining a tree having 7 or 8 levels. Both approaches add significantly to the memory subsystem overhead, resulting in increases in latency, decreases in bandwidth, a large amount of memory set aside to maintain the replay protection tree, and reduced ECC protection.

Encryption of the data in transit on the memory bus provides link-level cryptography, which provides confidentiality, integrity, and replay protection for the data transiting the memory data bus. The memory data bus can be, for example, a double data rate (DDR) bus between a CPU (central processing unit) SOC (system on a chip) and a DIMM (dual inline memory module), or a DDR bus between a GPU (graphics processing unit) and a DIMM. In one example, the link encryption can account for specific properties of a DDR bus and DIMM implementation to develop a high throughput link that has a low impact on performance.

The memory module can include a link decryption engine that performs link integrity check with a link integrity tag associated with the link protection. In one example, the link decryption engine decrypts write data to extract encrypted protected data and error checking and correction (ECC) data for the encrypted protected data when the link also include link encryption. In one example, the link decryption engine can decrypt the link encryption and perform link integrity check with a link integrity tag associated with the link encryption. The memory devices can then store the encrypted protected data and ECC data from the link decryption engine without the link encryption.

Similarly, the memory module can include a link encryption engine that applies link protection to read data to provide to the memory controller. In one example, the link decryption engine and the link encryption engine are the same engine. The link encryption engine enables the memory module to return the data with data link protection. In one example, the link encryption engine enables the memory module to return the data with data link encryption as well as link protection. The memory controller includes corresponding link encryption for write data and link protection/decryption for read data.

In one example, the link protection can be applied without the need to use ECC bits to store integrity information. Thus, the link protection can improve system reliability. The use of link protection can complement the application of data at rest encryption (e.g., such as MKTME) to provide link integrity and replay protection.

FIG. 1 is a block diagram of an example of a system in which system memory data is exchanged with link protection. System 100 illustrates memory coupled to a host. Host 110 represents a host computing system. An example of host 110 can represent a CPU SOC. Host 110 includes host hardware such as processor 112 and memory controller 120. The host hardware also includes hardware interconnects and driver/receiver hardware to provide the interconnection between host 110 and memory 140. Memory 140 includes array 144, which represents a memory array to store data for host 110. Memory controller 120 controls access to memory 140.

The host hardware supports the execution of host software on host 110. The host software can include host OS (operating system) 114. Host OS 114 represents a software platform under which other software will execute. Host OS 114 provides control to enable interfacing with hardware interconnections to couple to memory 140.

During execution, host OS 114 provides requests to access memory 140. The requests can be directly from host OS software, requests through APIs (application programming interfaces), or other mechanisms for a program executing under host OS 114 to request memory access. Memory access can include a write of data to array 144 or a read of data from array 144. In response to a host memory access request, memory controller 120 maps host-based addressing for memory resources to physical address locations of memory 140.

Host 110 includes I/O (input/output) 130 to interconnect with memory 140. Memory 140 includes corresponding I/O 150. C/A (command/address) 132 represents interface hardware including signal line interfaces to enable memory controller 120 to send commands to memory 140. C/A 152 represents interface hardware including signal line interfaces for memory 140 to receive commands issued by memory controller 120.

D[0:X-1] represent interface hardware including signal line interfaces to enable host 110 and memory 140 to exchange data associated with a command. D[0:X-1] represent a data bus with X data (DQ) lines. C/A 132 and C/A 152 represent interfaces to a command bus. For write commands, I/O 130 will drive the data bus. For read commands, I/O 150 will drive the data bus.

In one example, memory controller 120 includes data encryption (ENCR) 122 to encrypt data at rest. In one example, data encryption 122 implements MKTME to provide data at rest confidentiality. System 100 supports data encryption implementations other than MKTME. Any encryption mechanism can be used to store data in a way where data is provided to memory, and cannot be interpreted without a proper decryption of the data after retrieval from memory 140. Thus, when memory controller 120 applies data encryption 122, the data contents stored in memory array 144 are not in plaintext, and would need the application of decryption to be properly understood or used.

In one example, memory controller 120 includes ECC 124, which includes circuitry to generate ECC data to send with write data to memory 140. ECC is commonly applied in memory subsystems. With ECC 124, memory controller 120 can generate ECC data to protect the data. Array 144 is illustrated with data 162, which represents the system data stored in array 144, and illustrates ECC 164, which represents the ECC information corresponding to data 162. ECC 164 is generated by applying an ECC algorithm to data 162 (such as by XOR (exclusive OR) hardware) to generate an ECC code used to determine if there are transient bit flips or memory array errors, and potentially to correct the data errors. ECC 164 can be applied to data 162 whether data 162 is stored in plaintext, or whether data 162 represents encrypted data. Thus, data encryption 122 can encrypt the data, and ECC 124 can apply ECC to the encrypted data.

It will be understood that when memory controller 120 provide data encryption 122 to generate encrypted data, data 162 can be stored encrypted. Link protection (PROT) 128 will provide link protection for the encrypted data. The link protection can protect the data in transit. After verification of the link protection, the receiver can perform processing on verified transmitted data, such as ECC processing, computation of CRC, or even decrypting the data for use. The verification of the link protection does not decrypt the data itself, if it is encrypted. Thus, data can be encrypted at host 110, transferred to memory 140 for storage, and returned to host 110 later, having data at rest encryption the whole time.

In one example, link protection 128 includes link encryption. The link encryption can be in addition to encryption of the data at rest, where data at rest encryption is used. Prior to transmission, the data will have no link encryption, but the link encryption is added for the transmission, with the link decryption removed to leave encrypted data without link encryption.

In one example, memory controller 120 includes CRC (cyclic redundancy check) 126 to provide CRC information for data sent to memory 140. In one example, CRC 126 is not needed when memory controller 120 applies link encryption. Alternatively, CRC 126 can be used in conjunction with link encryption. CRC 126 enables memory controller 120 to apply a CRC algorithm to data sent to memory 140 to determine if an error occurs in transmission of data between host 110 and memory 140.

In one example, memory controller 120 includes link protection 128 to provide link protection (which may or may not include link encryption) for exchanges between I/O 130 and I/O 150. Link protection can include at least a link integrity message to allow verification of the transmitted data on the receiving end. Link protection can additionally include link encryption that can be decrypted on the receiving end. For writes, memory controller 120 will provide link protection and optionally link encryption, which memory 140 can verify/decrypt. For reads, memory 140 will provide link protection and optionally link encryption, which memory controller 120 can verify/decrypt.

In one example, link protection 128 provides command link protection, to protect command and address information over C/A 132 to memory 140. In one example, link protection 128 provide link protection over D[0:X-1] for write data, and verifies link protection for read data for the data link. In one example, link protection can encrypt command and address information to secure the C/A data.

In one example, when memory controller 120 performs link protection or link encryption or both, it will forego performance of CRC for transmission error checking. Memory controller 120 can forego CRC with link protection 128 because link protection 128 will provide link protection, which can make CRC 126 redundant.

Memory 140 includes controller 142, which represents a controller or control logic at the memory to receive and process commands from host 110. Controller 142 generates internal commands or internal operations to execute the commands received from memory controller 120. Link protection (PROT) 172 represents protection of the command and address information. Link protection 172 represents an ability of memory 140 to perform link verification of command and address information and optionally decrypt the command bus encryption. Link protection (PROT) 174 represents link protection and optionally link encryption on the data. Link protection 174 represents an ability of memory 140 to perform link protection verification and optionally decrypt link encryption for writes and provide link protection and optionally provide link encryption for reads.

In one example, memory 140 represents a memory module, such as a DIMM. A DIMM can include a registering clock driver (RCD) or other hardware as control for the memory module. In one example, link protection 172 for the command bus is implemented in the RCD. In one example, link protection 174 for the data bus is implemented in individual memory devices on the memory module. In one example, the memory module includes data buffers (DBs) to buffer data for individual memory devices on the module. In one example, link protection 174 is implemented at the data buffers. In one example, link protection 174 represents encryption hardware as a separate component for a memory module. More details of the various implementations are described below with respect to FIGS. 5A-5D.

In one example, link protection 128 can be referred to as an IDE (integrity and data encryption) or IDE engine. In one example, link protection 128 implements standards-based cryptography, such as AES (advanced encryption standard). In one example, link protection 128 implements AES in counter mode (AES-CTR). In one example, link protection 128 implements AES-GCM (AES in Galois/counter mode). In one example, link protection 128 implements AES-GMAC (AES with Galois message authentication code). AES-GMAC refers to an authentication-only variant of GCM, which enables link protection 128 to form an incremental message authentication code.

It will be understood that AES-GCM and AES-CTR encryption provides only XOR operation in the critical path, which has a low impact on delay and overall memory subsystem performance. AES in counter mode, whether AES-CTR, AES-GCM, or AES-GMAC, or some other counter-based cryptography implementation provide replay protection.

Link protection 128 can implement different forms of AES, which can include 256-bit key length, 128-bit key length, or some other key length. In one example, link protection 128 supports implementations of different integrity tag sizes for system 100. For example, system 100 can implement tag sizes of 32, 64, 96, or 128 bits.

Larger integrity tags will incur more latency overhead. With a smaller tag size, system 100 should refresh the data encryption key more frequently. In one example, the tag represents a message authentication code (MAC). In one example, system 100 provides tag or MAC information with an out-of-band signal line, which refers to a signal line outside the standard memory signal lines defined by standard. In one example, system 100 provides tag or MAC information inline with the data, such as by adding an additional burst to a sequence of bursts, or extending the burst length to include more data transfer per burst to send tag or MAC information.

In one example, system 100 provides the full memory bandwidth for data transmission, as opposed to other approaches that replace ECC bits with integrity data. In one example, the MAC computing overhead can be reduced by computing the MAC over multiple transmission units or multiple burst of a sequence of data transmissions. The MAC transmission overhead can be reduced or eliminated if the MAC information replaces bus level CRC or parity information for link error detection.

In one example of system 100, an SOC supports MKTME for data at rest protection, eliminating the need for encryption of data on the IDE path through link protection 128 (e.g., from caches on processor 112 to memory controller 120). The elimination of IDE path data encryption can reduce area and power used by cryptographic engines. The data will still be integrity protection and replay protected using a cryptographic algorithm such as AES-GMAC.

In one example, host 110 provides encryption for command and address information, separate from the link encryption that may be provided with the link protection provided by link protection 128 for C/A 132. In an alternate example, the command/address encryption can be eliminated similar to eliminating IDE data encryption. Eliminating the command and address encryption reduces area and power used by the cryptographic engines. Command and addresses are still integrity and replay protected using a cryptographic algorithm such as AES-GMAC for link encryption. It will be understood that removing the command and address encryption could allow leaking address side-channel information if the address is not encrypted.

In one example, host 110 and memory 140 exchange integrity tag information (e.g., MAC) via a reserved signal line, separate from C/A 132 and D[0:X-1]. In one example, the dedicated signal line allows sending 1 bit per 8-bit data lane. Thus, the MAC may need to be accumulated over multiple bytes of transfer across the data bus. For example, for a MAC size 32, the 32 bits of MAC data would be sent over 32 bytes of data transfer. Larger tag sizes, such as 64, 96, or 128 would need to be accumulated over more data transfer, which can result in increased latency for data transfers to accumulate the tag information to be able to decrypt the data.

In one example, the initialization vector (IV) value used by the encryption engine (e.g., AES-GMAC, AES-GCM, or other encryption) does not need to be transmitted explicitly on the link. For example, the host and memory can perform a handshake and agree on the number of bytes that are part of a given MAC epoch and update the IV internally for each MAC epoch. Not having to send the IV value reduces the bandwidth overhead as the IV does not have to be transferred every time a MAC is set.

It will be understood that PCIe (peripheral component interconnect express) is a transmission standard that allows for link protection. However, PCIe has packetized data, which is not the case with a memory system data bus, where data is exchanged in parallel with different devices as separate parts of a whole data transmission. Thus, the link protection of PCIe cannot be applied to the system data bus illustrated in system 100. An implementation of link protection 128 that takes advantages of parallel processing can make efficient use of an instruction pipeline or hardware pipeline. Both AES-GCM and AES-GMAC can accept initialization vectors (IVs) of arbitrary length and be implemented in parallel. Thus, link protection 128 can provide these or other cryptographic implementations for parallel link protection for data across parallel devices.

In one example, host 110 represents a host board, which can include BIOS (basic input/output system) 116. BIOS 116 is typically stored in a nonvolatile storage on the motherboard and accessed and executed by processor 112 prior to loading host OS 114. BIOS 116 can perform various system configuration operations, including operations related to the interaction of host 110 and memory 140. In one example, BIOS 116 triggers a secure module for key exchange between memory controller 120 and memory 140.

The BIOS is not the only mechanism that could be used to trigger key exchange. For example, an operation of host OS 114 can trigger a secure operation to perform key exchange. In one example, key exchange includes writing to an RCD or directly to the memory devices to switch to a new key. In one example, system 100 can swap out keys after a preset or predetermined number of retries. In one example, system 100 can switch keys to discern between transmit errors and other errors. For example, after a repeated error, system 100 can switch encryption keys and try the transaction again to determine if the error manifests again. In one example, system 100 supports multikey operation for link encryption. The use of multiple keys for link encryption would involve the management of latency and buffering to operate with different keys.

In one example, link protection 128 performs link encryption on a new cryptographic key to send to memory 140. After passing the new cryptographic key to memory 140, memory controller 120 can switch to using the new cryptographic key for link encryption, and memory 140 will start to use the new key after receiving it.

Figure 2:
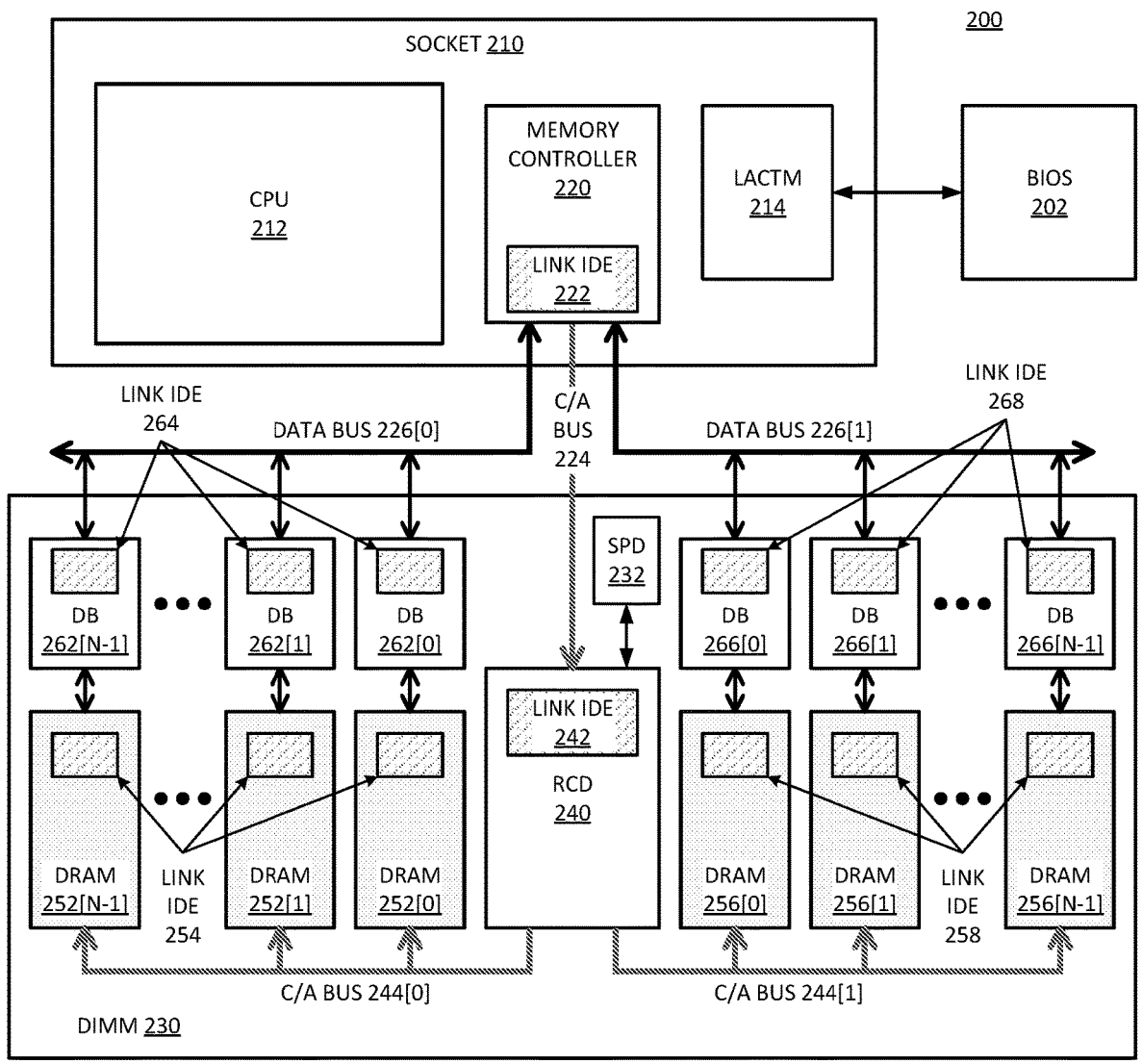
FIG. 2 is a block diagram of an example of a memory module with memory devices to exchange data with link protection.

FIG. 2 is a block diagram of an example of a memory module with memory devices to exchange data with link protection. System 200 represents a system in accordance with an example of system 100. System 200 includes socket 210 coupled to DIMM 230. Socket 210 represents a CPU socket, which can include CPU 212 and memory controller 220. DIMM 230 includes multiple DRAM devices.

System 200 illustrates an example of a system with memory devices that share a control bus or command bus (C/A (command/address) bus 244[0] for one channel and C/A bus 244[1] for the other channel) and data buses (data bus 226[0] for the one channel and data bus 226[1] for the other channel). The memory devices are represented as DRAM (dynamic random access memory) devices. Each channel has N DRAM devices, DRAM 252[0:(N-1)] (collectively, DRAM devices 252) for one channel, and DRAM 256[0:(N-1)] (collectively, DRAM devices 256) for the other channel, where N can be any integer. In one example, N includes one or more ECC DRAM devices in addition to the data devices. In one example, the two separate channels share C/A bus 224 connection between memory controller 220 and RCD 240. In one example, the separate channels will have separate C/A buses. The DRAM devices can be individually accessed with device specific commands and can be accessed in parallel with parallel commands.

RCD (registered clock driver or registering clock driver) 240 represents a controller for DIMM (dual inline memory module) 230. In one example, RCD 240 receives information from memory controller 220 and buffers the signals to the various DRAM devices. By buffering the input signals from memory controller 220, the controller only sees the load of RCD 240, which can then control the timing and signaling to the DRAM devices.

In one example, RCD 240 controls the signals to DRAM devices 252 through C/A bus 244[0] and controls the signals to DRAM devices 256 through C/A bus 244[1]. In one example, RCD 240 has independent command ports for separate channels. In one example, DIMM 230 includes data buffers to buffer the data bus signals between the DRAM devices of DIMM 230 and memory controller 220.

Data bus 226[0] provides a data bus for DRAM devices 252, which are buffered with data buffers DB 262[0:(N-1)]. Data bus 226[1] provides a data bus for DRAM devices 256, which are buffered with data buffers DB 266[0:(N-1)]. System 200 illustrates a one-to-one relationship between data buffers and DRAM devices. In one example, there are fewer data buffers than DRAM devices.

C/A bus 244[0] and C/A bus 244[1] (collectively, C/A buses 244) are typically unilateral buses or unidirectional buses to carry command and address information from memory controller 220 to the DRAM devices. Thus, C/A buses 244 can be multi-drop buses. Data bus 226[0] and data bus 226[1], collectively data buses 226, are traditionally bidirectional, point-to-point buses.

System 200 represents an example of a system that provides link protection and optionally provides link encryption between socket 210 and DIMM 230. In one example, memory controller 220 includes link IDE (integrity and data encryption) 222, which can be referred to as an IDE engine. Link IDE 222 represents circuitry and logic of memory controller 220 that mirrors the link protection and optional link encryption of DIMM 230, enabling the exchange of protected link data.

In one example, RCD 240 includes link IDE 242, which represents an IDE engine on the RCD to perform link verification and optional decryption of command and address information for link protection on C/A bus 224. In one example, DIMM 230 includes link IDE 264 and link IDE 268. Link IDE 264 represents IDE engines in DB 262 and link IDE 268 represents IDE engines in DB 266. In one example, DIMM 230 includes link IDE 254 and link IDE 258. Link IDE 254 represents IDE engines in DRAM devices 252 and link IDE 258 represents IDE engines in DRAM devices 256.

Link IDE 264 and link IDE 268 are alternatively to link IDE 254 and link IDE 258, respectively. Thus, system 200 would include an IDE engine either in the data buffers or in the memory devices. Application of the IDE engines in the memory devices enables an unbuffered DIMM or unbuffered memory implementation. While system 200 could include IDE engines in the memory devices in an implementation that has data buffers, such an implementation would have significant inefficiencies in the case that a link error in discovered. Typically, the memory devices would only have IDE engines if there are no DBs in the system. If there are DBs in the system, they would normally include the IDE engines to manage link protection instead of the memory devices.

In one example, LACTM (link and configuration trusted module) 214 can manage configuration of link IDE 222 of memory controller and the link IDEs of DIMM 230. In one example, LACTM 214 represents a software trusted module. In one example, LACTM 214 represents a firmware trusted module. In one example, LACTM 214 represents a dedicated hardware engine or microcontroller as the trusted module. It will be understood that a single memory controller can manage multiple memory channels (e.g., DDR channels to different DIMMs). Each memory channel can have one or more DIMMs plugged into it. Socket 210 can include multiple memory controllers 220, which each manage one or more memory channels.

In one example, BIOS 202 provides a list of DIMMs (including DIMM 230) to LACTM 214. LACTM 214 represents a trust module or trusted module that manages the link between memory controller 220 and the memory, and manages configuration information related to the memory. A trusted module refers to secure hardware, such as an out-of-bound or other secure microprocessor. The secure hardware can manage cryptographic keys or other attestations of security or anti-tampering. In one example, LACTM 214 manages keys associated with link encryption by link IDE 222 and the link IDEs on DIMM 230.

In one example, LACTM 214 manages authenticated key exchange with DIMM 230 and other DIMMs that may be connected to socket 210. LACTM 214 can set up a secure session or secure mode for key exchange. In one example, LACTM 214 generates a random key and programs it into DIMM 230. In the case of multiple DIMMs, LACTM 214 can generate a random key for each DIMM and program the keys into respective DIMMs. LACTM 214 can configure memory controller 220 with the same key (for each DIMM in the case of multiple DIMMs). In one example, LACTM 214 computes an initial IV based on the unique ID (identifier) of the DB or RCD and configures the initial IVs into the memory controller channel. Alternatively, the IV can be based on a different value than the ID of the DB or RCD.

In one example, once the keys are updated for both memory controller 220 and DIMM 230, LACTM sets a bit in memory controller 220 to trigger an in-band mechanism to switch to a new cryptographic key. The link IDEs of system 200 can then implement the cryptographic operations based on the keys. In one example, LACTM 214 can hand off a secure session to a runtime trusted module (not specifically illustrated) to enable the runtime module to periodically update IDE keys.

In one example, each DIMM includes a unique (per part) certificate chain signed by the DIMM manufacturer or the system integrator, or both the DIMM manufacturer and system integrator. Such certificates attest to the authenticity of the device and assure there are no malicious interposers inside the DIMM itself. In one example, the certificate is used as part of an authenticated key exchange. In one example, DIMM 230 includes SPD (serial presence detect) 232, which represents an SPD hub. SPD 232 as an SPD hub provides a center or hub for control plane communication between components of DIMM 230 and RCD 240, as well as providing one or more sensor functions. In one example, SPD 232 provides a root-of-trust for DIMM 230, which provides the certificate or other form of certification of trust. In one example, SPD 232 participates in key exchanges for components that include an IDE engine.

In one example, SPD 232 performs authenticated key exchange to set up a secure session. In one example, SPD 232 provides asymmetric cryptographic operation to set up the secure session. The secure session can enable memory controller 220 to send an IDE key securely to SPD 232, which can then propagate the key securely on DIMM 230.

Thus, SPD 232 can forward the crypto key internally to RCD 240. In one example, RCD 240 distributes the cryptographic key or keys to data buffers 262 and data buffer 266 or to DRAM devices 252 and DRAM device 256. In one example, RCD 240, DBs 262, DBs 266, DRAMs 252, and DRAMs 256 can determine the initial IV value without external configuration. In one example, the initial IV is explicitly configured into the components of DIMM 230. In one example, once the keys are updated in all the cryptographic engines of DIMM 230, DIMM 230 can apply an in-band mechanism to switch to a new key.

In one example, an IDE engine (e.g., link IDE 264, link IDE 268, link IDE 254, link IDE 258) can implement operations on an individual portion of a data word. Depending on the cryptographic engine, the operation by link IDE 222 can be separated into the various parallel portions. In one example, system 200 provides an integrity solution per dataword portion (e.g., per DB or per DRAM device). In one example, system 200 can provide a cacheline solution, with a link decoder/encoder on DIMM 230 that can generate link protection perform verification of link protection. In a case where link encryption is used, the cacheline solution can decrypt an entire write dataword and encrypt an entire read data word to exchange with socket 210.

In one example, system 200 has a reserved lane per device to provide a MAC or integrity tag. In one example, the reserved lane can provide an extra DQS (data strobe) pair of a DQ set with parity lanes used to provide the MAC. Using the parity or CRC signal lines can reduce the bandwidth impact of MAC transmission. In an alternate example, data bits can be sent first using all the lanes, which can include the extra lanes, followed by the MAC bits at the end, which can reduce transmit latency. In an example where MAC bits are sent at the end of the data burst, both data framing and command framing would be adapted to allow for MAC transmission at the end of each frame.

Figure 3:
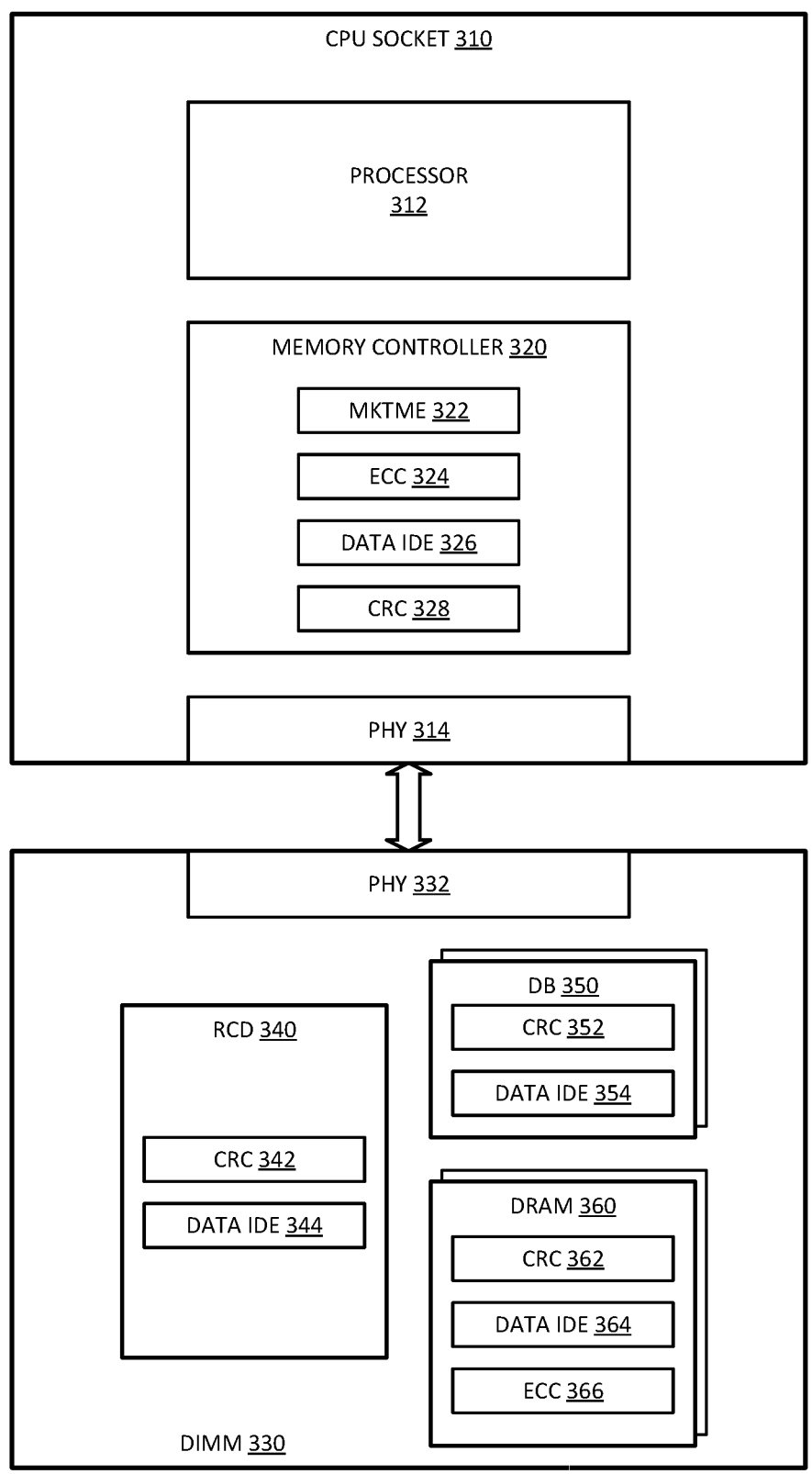
FIG. 3 is a block diagram of an example of a system with a host and system memory that exchange data with link protection and CRC.

FIG. 3 is a block diagram of an example of a system with a host and system memory that exchange data with link protection and CRC. System 300 represents an example of a system in accordance with system 200. System 300 represents hardware components of a system with link management for link protection.

CPU socket 310 represents a socket or SOC that includes processor 312 and memory controller 320. Processor 312 represents the processing logic for system 300, such as a CPU. A similar system configuration can be applied, for example, to a GPU. Memory controller 320 represents circuitry to manage access to system memory. DIMM 330 represents a memory module that includes system memory.

For a data write being processed from CPU socket 310 to DIMM 330, processor 312 executes an operation that generates a write request for data stored in memory of DIMM 330. In one example, memory controller 320 executes MKTME to perform MKTME memory encryption. MKTME encryption represents an example of data at rest encryption. Other forms of data at rest encryption can be applied. MKTME may be available in system 300 and enabled for some transactions and not enabled for other transactions. Thus, memory controller 320 can selectively apply data encryption. The application of encryption for the data at rest can produce protected data for the write transaction.

Memory controller 320 generates the memory write command and address information and prepares the write data. Preparation of the write data can include generation of ECC with ECC 324. Memory controller 320 can schedule the write transaction and have the write data and corresponding ECC prepared to send to DIMM 330. It will be understood that if data encryption is applied, ECC 324 can generate the ECC computation for the encrypted data. If data encryption is not applied, ECC 324 can generate the ECC computation for unencrypted data.

In one example, data IDE 326 generates link protection/encryption for memory controller 320. Data IDE 326 represents an example of an IDE engine for memory controller 320. In one example, data IDE 326 generates link IDE to cryptographically protect the in transit data. In one example, data IDE 326 operates after scheduling decisions have been made; thus, the transactions can be fully ordered, including potential reordering of transactions to time data transmission on the bus. In one example, data IDE 326 represents link protection/encryption for the data bus, including the source data and its corresponding ECC (whether encrypted data (i.e., protected data) or unencrypted data). In one example, memory controller 320 includes an IDE engine (which could be the same IDE engine as data IDE 326) to protect the command and address information to send to DIMM 330.

In system 300, memory controller 320 executes CRC 328 to generate CRC, parity, or other bus level reliability information for the data transmission. The computation of CRC 328 can be performed on the protected link content (the protected data and its ECC encrypted with link encryption). CRC or parity can be used as a protection against transmission errors.

PHY 314 represents a physical layer or physical interface of CPU socket 310 to DIMM 330. In one example, PHY 314 includes hardware interface components to drive a write command and the write data to DIMM 330. In one example, PHY 314 can be considered part of memory controller 320. Memory controller 320 can manage PHY 314 to send commands and exchange data with the memory of system 300.

DIMM 330 includes PHY 332, which represents the hardware interface with PHY 314 of CPU socket 310. In one example, PHY 332 can be considered part of DBs 350 or part of DRAMs 360. In one example, where command information is link encrypted, RCD 340 includes CRC 342 and data IDE 344. CRC 342 enables RCD 340 to check CRC information for transmission errors. Thus, RCD 340 can check the command bus parity or CRC for errors and request any retries needed based on detected errors.

DB 350 represents multiple data buffers on DIMM 330. DRAM 360 represents multiple DRAM devices on DIMM 330. In one example, DB 350 include CRC 352 to check parity or CRC information for the data bus. In one example, in an unbuffered DIMM, DRAM 360 can include CRC check logic as represented by CRC 362. Similar to CRC 342 of RCD 340, CRC 352 or CRC 362 can check for transmission errors on the data bus and request any retries needed.

In one example, data that has been checked and shown to have no transmission errors will be sent to the IDE equivalent on the DIMM side to decrypt the content, to check the integrity of data received, or to decrypt the content and check the integrity. Data IDE 344 represents an IDE engine of RCD 340 to verify link protection/decrypt link encryption for the command and address information. Data IDE 354 represents an IDE engine of DB 350 to perform link verification/decryption. After verifying the link protection or decrypting the link encryption in DB 350, DB 350 can send the data and ECC information to DRAM 360, which can include protected data (data at rest encryption) and accompanying ECC.

In one example, where DIMM 330 does not include DB 350, DRAM 360 can include data IDE 364 as an IDE engine to perform link protection verification for write data and generate link protection for read data. IDE 364 can decrypt link encryption for the data bus for write data and generate link encryption for read data. If RCD 340 detects a cryptographic error for the command and address information, RCD 340 can make a request for memory controller 320 to retry the command transaction. If DB 350 or DRAM 360 detect a cryptographic error in the transmission, they can request a retry of the data. Once the cryptographic checks for the link encryption pass, whether by DB 350 or DRAM 360, DRAM 360 can process the command and data for storing in the memory devices. Storing of the data can include storing ECC 366 with the source write data from memory controller 320.

In one example, data IDE 326 generates encrypted data and a MAC, a link integrity tag, or other cryptographic information to be used in decryption of the link encryption. In one example, PHY 314 and PHY 332 include one or more signal lines or wires to send the MAC information. In one example, memory controller 320 includes the MAC information as part of the data payload to transmit to DIMM 330. For example, the MAC information can be sent as part of a data burst from memory controller 320 to DIMM 330. The IDE engines can apply the MAC or link integrity tag information in the link encryption.

MKTME 322 can provide assurance that the data stored in DRAM 360 cannot be used if a physical attack reads data from the memory. Data IDE 326 can ensure that the data transmitted is transmitted correctly and securely. Additionally, data IDE 326 can enable replay protection, in that when data is written to a specific location in memory, a read from that memory location results in the same data.

Figure 4:
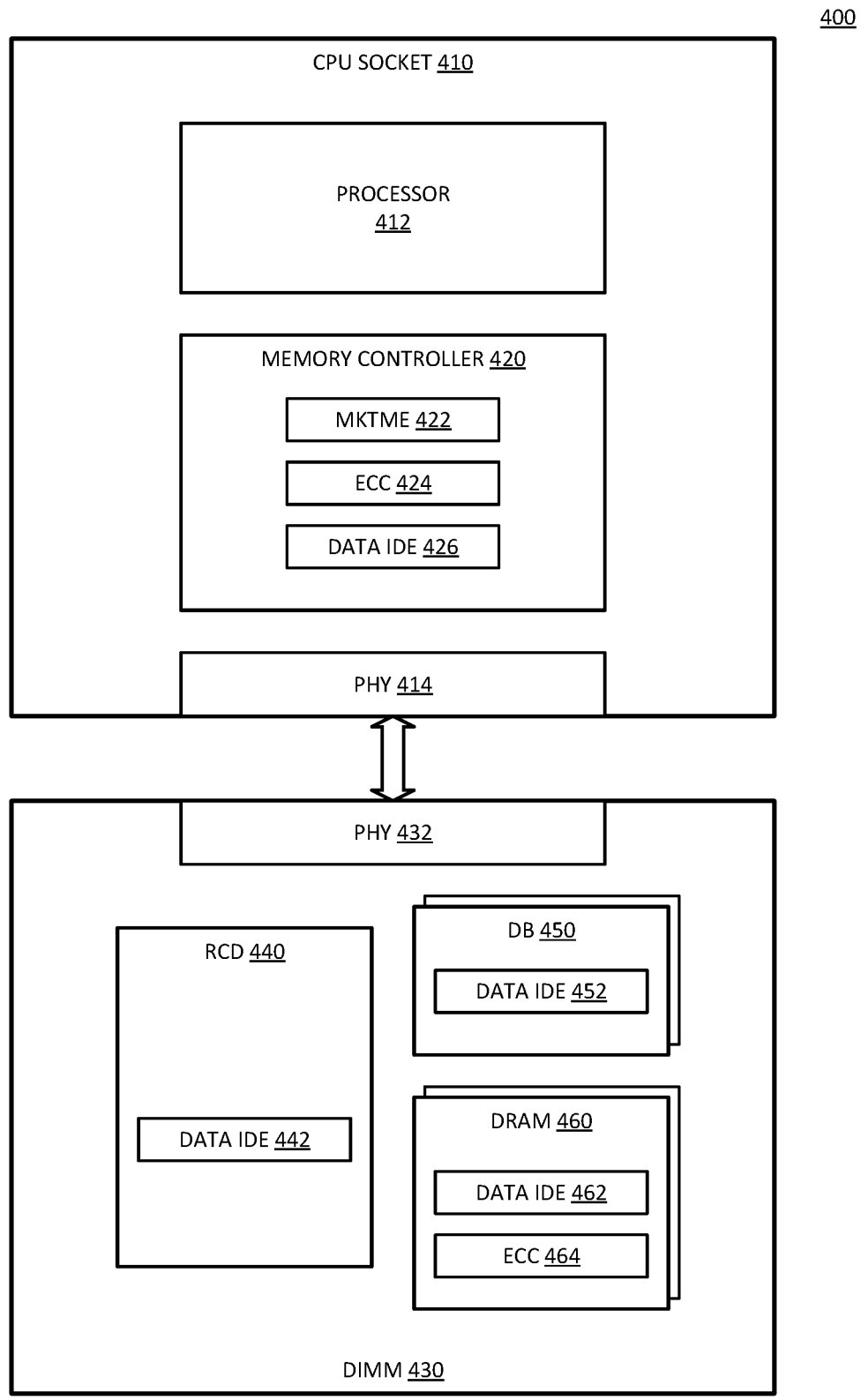
FIG. 4 is a block diagram of an example of a system with a host and system memory that exchange data with link protection, without CRC.

FIG. 4 is a block diagram of an example of a system with a host and system memory that exchange data with link protection, without CRC. System 400 represents an example of a system in accordance with system 200. System 400 represents hardware components of a system with link management for link protection.

CPU socket 410 represents a socket or SOC that includes processor 412 and memory controller 420. Processor 412 represents the processing logic for system 400, such as a CPU. A similar system configuration can be applied, for example, to a GPU. Memory controller 420 represents circuitry to manage access to system memory. DIMM 430 represents a memory module that includes system memory.

For a data write being processed from CPU socket 410 to DIMM 430, processor 412 executes an operation that generates a write request for data stored in memory of DIMM 430. In one example, memory controller 420 executes MKTME to perform MKTME memory encryption. MKTME encryption represents an example of data at rest encryption. Other forms of data at rest encryption can be applied. MKTME may be available in system 400 and enabled for some transactions and not enabled for other transactions. Thus, memory controller 420 can selectively apply data encryption. The application of encryption for the data at rest can produce protected data for the write transaction.

Memory controller 420 generates the memory write command and address information and prepares the write data. Preparation of the write data can include generation of ECC with ECC 424. Memory controller 420 can schedule the write transaction and have the write data and corresponding ECC prepared to send to DIMM 430. It will be understood that if data encryption is applied, ECC 424 can generate the ECC computation for the encrypted data. If data encryption is not applied, ECC 424 can generate the ECC computation for unencrypted data.

In one example, data IDE 426 generates link protection/encryption for memory controller 420. Data IDE 426 represents an example of an IDE engine for memory controller 420. In one example, data IDE 426 generates link IDE to cryptographically protect the in transit data. In one example, data IDE 426 operates after scheduling decisions have been made; thus, the transactions can be fully ordered, including potential reordering of transactions to time data transmission on the bus. In one example, data IDE 426 represents link protection/encryption for the data bus, including the source data and its corresponding ECC (whether encrypted data (i.e., protected data) or unencrypted data). In one example, memory controller 420 includes an IDE engine (which could be the same IDE engine as data IDE 426) to protect the command and address information to send to DIMM 430. In system 400, data IDE 426 can provide link integrity, eliminating the need for CRC or parity information.

PHY 414 represents a physical layer or physical interface of CPU socket 410 to DIMM 430. In one example, PHY 414 includes hardware interface components to drive a write command and the write data to DIMM 430. In one example, PHY 414 can be considered part of memory controller 420. Memory controller 420 can manage PHY 414 to send commands and exchange data with the memory of system 400.

DIMM 430 includes PHY 432, which represents the hardware interface with PHY 414 of CPU socket 410. In one example, PHY 432 can be considered part of DBs 450 or part of DRAMs 460. In one example, where command information is link encrypted, RCD 440 includes data IDE 442. DB 450 represents multiple data buffers on DIMM 430. DRAM 460 represents multiple DRAM devices on DIMM 430. The IDE engines on DIMM 430 can decrypt the content, check the integrity of data received, or decrypt the content and check the integrity. Checking the integrity can provide a determination of proper link transmission, which allows system 400 to eliminate the use of CRC.

Data IDE 442 represents an IDE engine of RCD 440 to verify link protection/decrypt link encryption for the command and address information. Data IDE 452 represents an IDE engine of DB 450 to perform link verification/decryption. After verifying the link protection or decrypting the link encryption in DB 450, DB 450 can send the data and ECC information to DRAM 460, which can include protected data (data at rest encryption) and accompanying ECC.

In one example, where DIMM 430 does not include DB 450, DRAM 460 can include data IDE 462 as an IDE engine to perform link protection verification for write data and generate link protection for read data. IDE 462 can decrypt link encryption for the data bus for write data and generate link encryption for read data. If RCD 440 detects a cryptographic error for the command and address information, RCD 440 can make a request for memory controller 420 to retry the command transaction. If DB 450 or DRAM 460 detect a cryptographic error in the transmission, they can request a retry of the data. Once the cryptographic checks for the link encryption pass, whether by DB 450 or DRAM 460, DRAM 460 can process the command and data for storing in the memory devices. Storing of the data can include storing ECC 464 with the source write data from memory controller 420.

In one example, data IDE 426 generates encrypted data and a MAC, a link integrity tag, or other cryptographic information to be used in decryption of the link encryption. In one example, PHY 414 and PHY 432 include one or more signal lines or wires to send the MAC information. In one example, data IDE 426 can replace the use of CRC. In such a case, MAC information or link integrity tag information can be sent over the CRC signal lines. Thus, the CRC bandwidth can be replaced with the use of integrity tag information. In one example, memory controller 420 includes the MAC information as part of the data payload to transmit to DIMM 430. For example, the MAC information can be sent as part of a data burst from memory controller 420 to DIMM 430. The IDE engines can apply the MAC or link integrity tag information in the link encryption.

MKTME 422 can provide assurance that the data stored in DRAM 460 cannot be used if a physical attack reads data from the memory. Data IDE 426 can ensure that the data transmitted is transmitted correctly and securely. Additionally, data IDE 426 can enable replay protection, in that when data is written to a specific location in memory, a read from that memory location results in the same data.

Figure 5A:
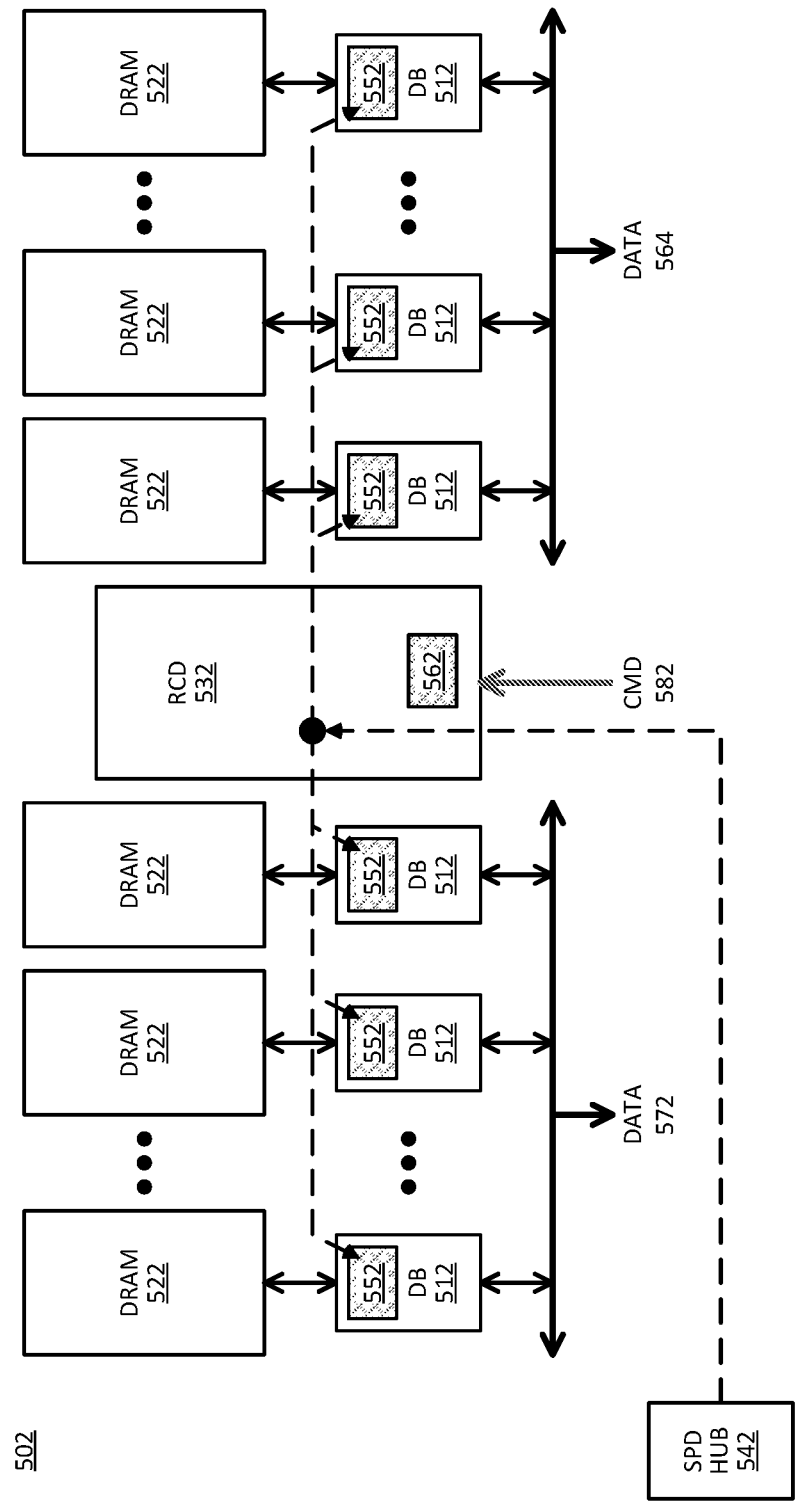
FIG. 5A is a block diagram of an example of a memory system with a data link protection engine in the data buffer.

FIG. 5A is a block diagram of an example of a memory system with a data link protection engine in the data buffer. System 502 represents an example of a memory module in accordance with system 100, system 200, system 300, or system 400. System 502 illustrates IDE engines on a per DB and RCD basis.

System 502 illustrates DRAM 522, which represents memory devices or DRAM devices to store system data. DB 512 represent data buffers that buffer the data bus between the host and the memory module. Data 572 represents the data bus or data buses for system 502. CMD (command) 582 represents a command bus from the host to the memory module.

System 502 represents an example of a buffered DIMM where link protection provides integrity and replay protection for data in transit between the host and the memory devices. The link protection can be referred to as DDR IDE, referring to integrity and data encryption for a double data rate data channel. In one example, the DDR IDE applies AES-GMAC or another AES-CTR algorithm.

In one example, the memory controller of the host encrypts the data with MKTME to provide data at rest protection, and the DDR IDE does not need to perform additional encryption. System 502 can generate integrity tag or MAC information to verify the integrity of the data transmission.

In one example, RCD 532 includes IDE engine 562 or a crypto engine to perform link decryption of CMD 582 for command and address information. In one example, RCD 532 also handles control signals, which allows simpler mapping of functions. In one example, DB 512 includes IDE engine 552 or a crypto engine to perform link protection/decryption of data 572 for write data. In one example, IDE engine 552 can provide link protection/encryption for read data to send back to the memory controller.

In one example, SPD hub 542 provides a center for key exchange. Thus, SPD hub 542 can manage the key exchange, and IDE engine 552 can implement the cryptography based on the keys provided. In one example, SPD hub 542 provides key information to RCD 532, which can propagate the keys to IDE engine 552.

Figure 5B:
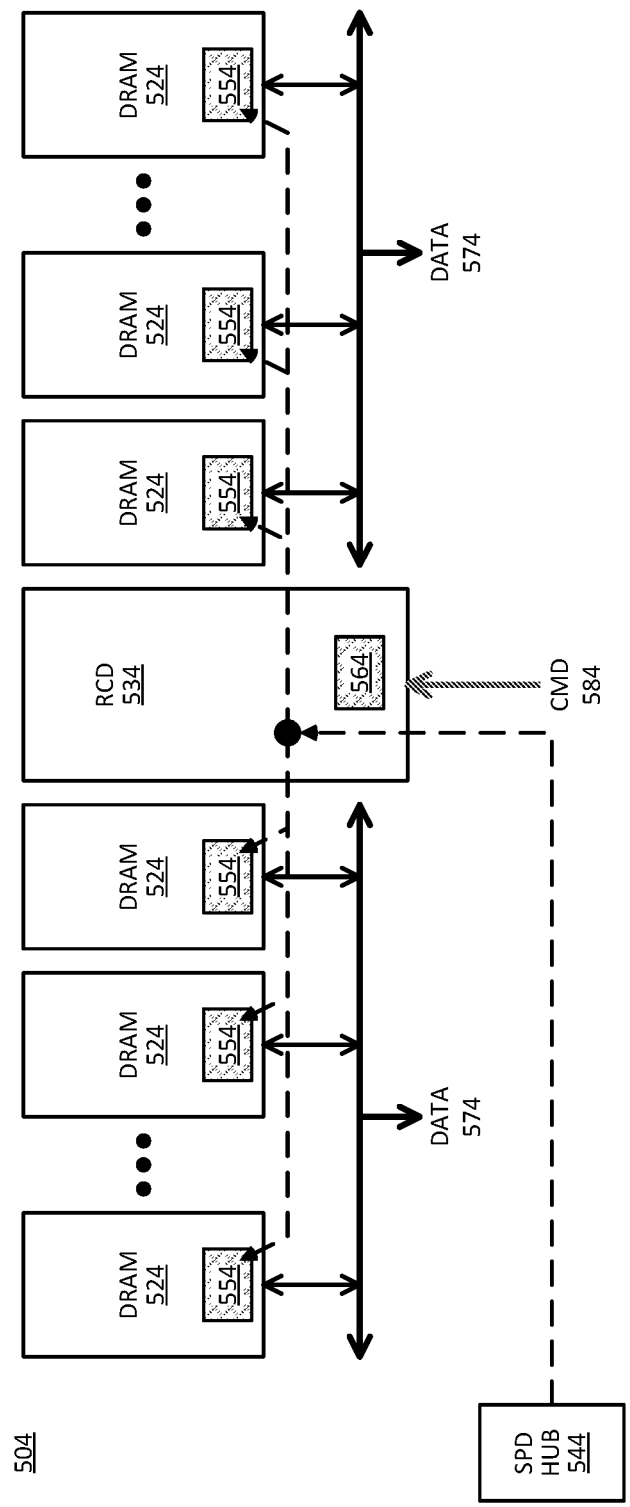
FIG. 5B is a block diagram of an example of a memory system with a data link protection engine in the memory device.

FIG. 5B is a block diagram of an example of a memory system with a data link protection engine in the memory device. System 504 represents an example of a memory module in accordance with system 100, system 200, system 300, or system 400. System 504 illustrates IDE engines on a per memory device and RCD basis.

System 504 illustrates DRAM 524, which represents memory devices or DRAM devices to store system data. System 504 illustrates an example of a memory module without data buffers. Data 574 represents the data bus or data buses for system 504. CMD (command) 584 represents a command bus from the host to the memory module.

System 504 represents an example of an unbuffered DIMM where link protection provides integrity and replay protection for data in transit between the host and the memory devices. The application of link protection in the memory devices themselves can provide additional protection for the data over the buses internal to the memory module. The link protection can be referred to as DDR IDE, referring to integrity and data encryption for a double data rate data channel. In one example, the DDR IDE applies AES-GMAC or another AES-CTR algorithm.

In one example, the memory controller of the host encrypts the data with MKTME to provide data at rest protection, and the DDR IDE does not need to perform additional encryption. System 504 can generate integrity tag or MAC information to verify the integrity of the data transmission.

In one example, RCD 534 includes IDE engine 564 or a crypto engine to perform link decryption of CMD 584 for command and address information. In one example, RCD 534 also handles control signals, which allows simpler mapping of functions. In one example, DRAM 524 includes IDE engine 554 or a crypto engine to perform link protection/decryption of data 574 for write data. In one example, IDE engine 554 can provide link protection/encryption for read data to send back to the memory controller. IDE engine 554 allows the memory devices to perform link integrity checking or decryption of link encryption locally at the memory devices.

In one example, SPD hub 544 provides a center for key exchange. Thus, SPD hub 544 can manage the key exchange, and IDE engine 554 can implement the cryptography based on the keys provided. In one example, SPD hub 544 provides key information to RCD 534, which can propagate the keys to IDE engine 554.

Figure 5C:
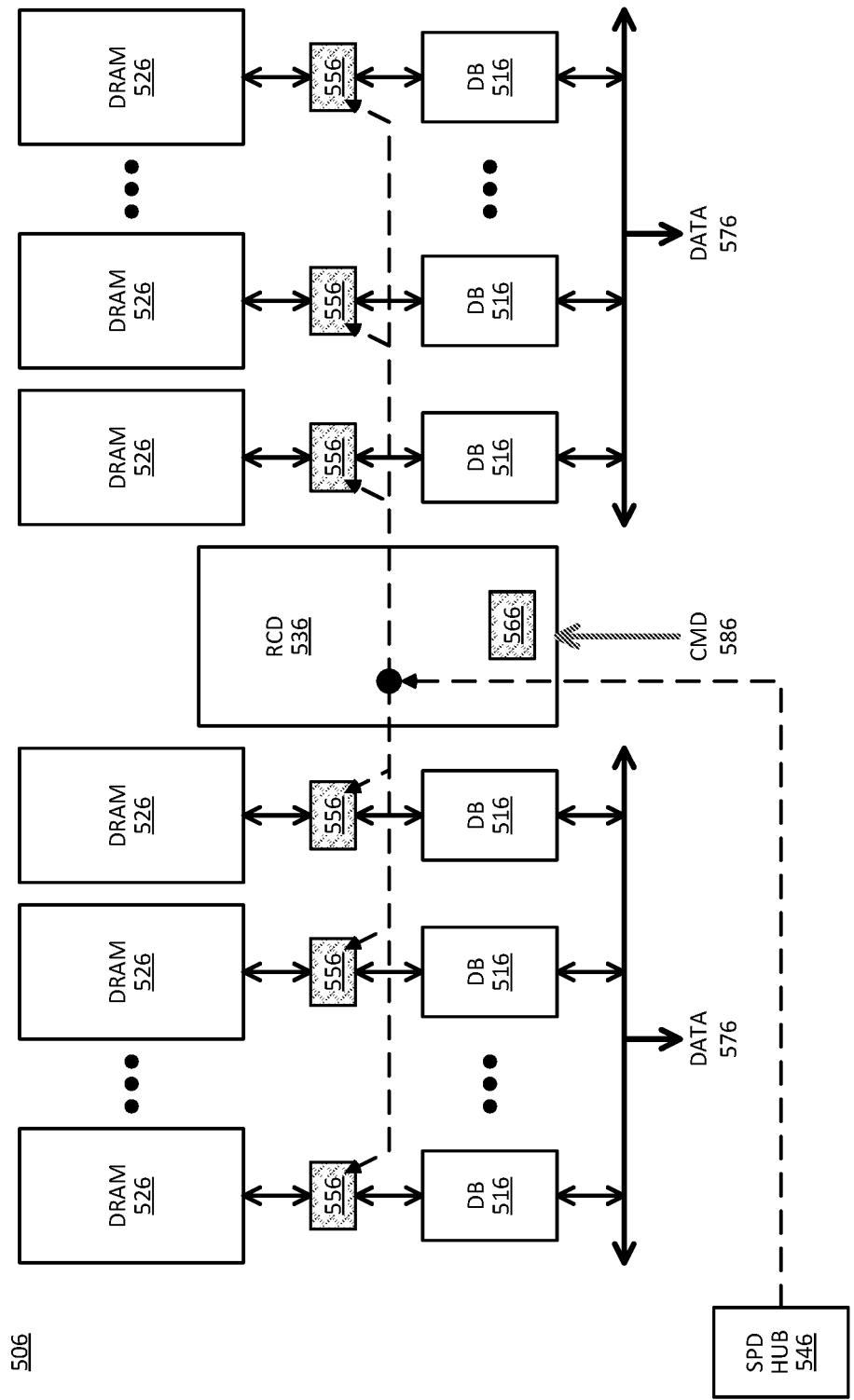
FIG. 5C is a block diagram of an example of a memory system with a data link protection engine between each data buffer and DRAM pair.

FIG. 5C is a block diagram of an example of a memory system with a data link encryption engine between each data buffer and DRAM pair. System 506 represents an example of a memory module in accordance with system 100, system 200, system 300, or system 400. System 506 illustrates IDE engines as a separate component of the memory module.

System 506 illustrates DRAM 526, which represents memory devices or DRAM devices to store system data. DB 516 represent data buffers that buffer the data bus between the host and the memory module. Data 576 represents the data bus or data buses for system 506. CMD (command) 586 represents a command bus from the host to the memory module. In one example, system 506 includes DB 516 to buffer data 576 between DRAM 526 and the host.

System 506 represents an example of a buffered DIMM where link protection provides integrity and replay protection for data in transit between the host and the memory devices. The link protection can be referred to as DDR IDE, referring to integrity and data encryption for a double data rate data channel. In one example, the DDR IDE applies AES-GMAC or another AES-CTR algorithm.

In one example, the memory controller of the host encrypts the data with MKTME to provide data at rest protection, and the DDR IDE does not need to perform additional encryption. System 506 can generate integrity tag or MAC information to verify the integrity of the data transmission.

In one example, RCD 536 includes IDE engine 566 or a crypto engine to perform link decryption of CMD 586 for command and address information. In one example, RCD 536 also handles control signals, which allows simpler mapping of functions. In one example, the memory module includes IDE engine 556 or crypto engines implemented as separate components on the memory module. In one example, IDE engine 556 is a separate link decryption chip on the module for write data. In one example, IDE engine 556 represents a link encryption chip on the module for read data. The link decryption or encryption chip can be specific to each DRAM 526. IDE engine 556 performs link protection/decryption of data 576 for write data. In one example, IDE engine 556 can provide link protection/encryption for read data to send back to the memory controller. In one example, IDE engine 556 is implemented as an intermediate component between DRAM 526 and DB 516. It will be understood that use of an intermediate component for the IDE engine is likely to introduce additional memory latency as well as increasing component count and module cost.

In one example, SPD hub 546 provides a center for key exchange. Thus, SPD hub 546 can manage the key exchange, and IDE engine 556 can implement the cryptography based on the keys provided. In one example, SPD hub 546 provides key information to RCD 536, which can propagate the keys to IDE engine 556.

Figure 5D:
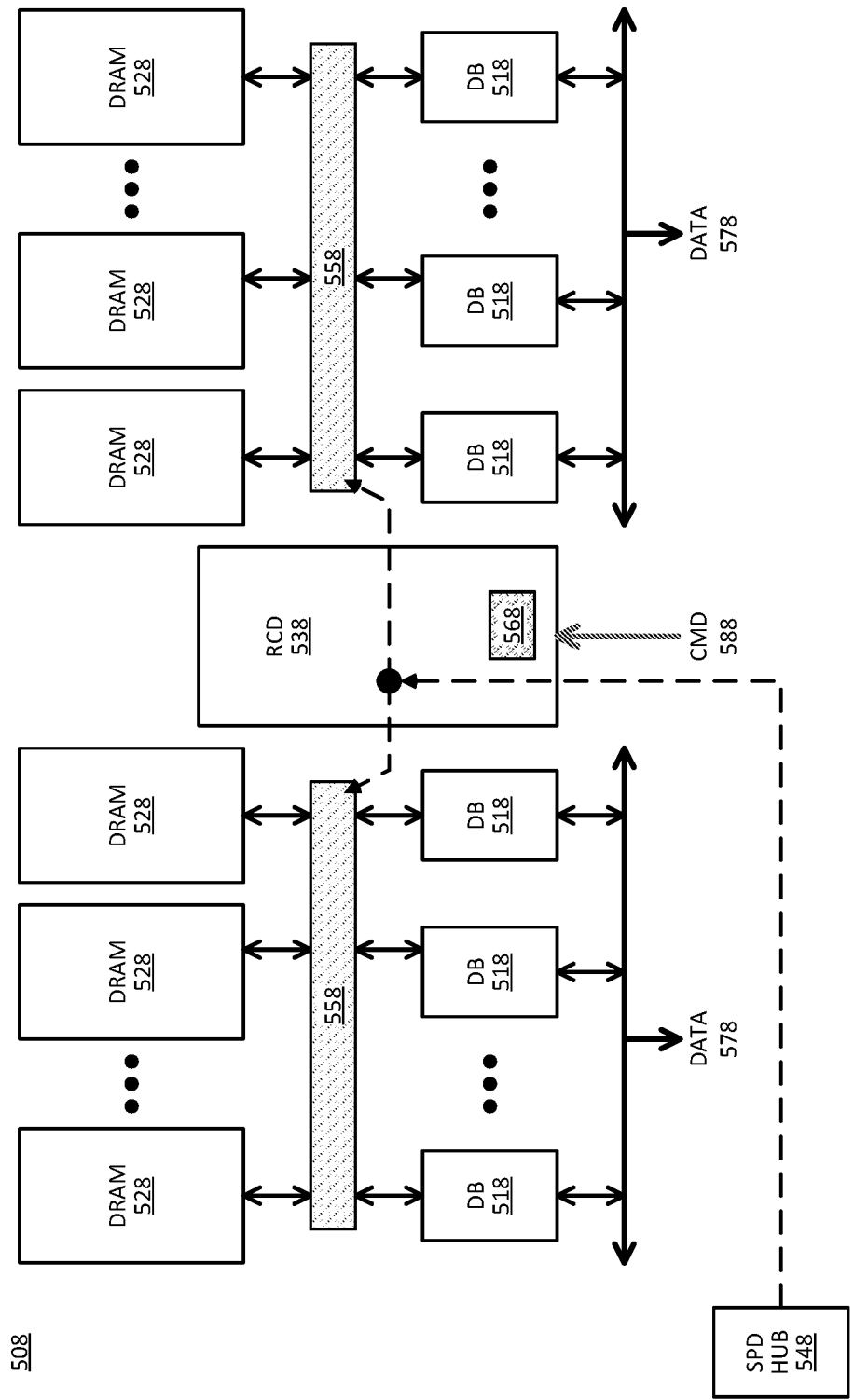
FIG. 5D is a block diagram of an example of a memory system with a data link protection engine between the data buffers and the DRAMs.

FIG. 5D is a block diagram of an example of a memory system with a data link protection engine between the data buffers and the DRAMs. System 508 represents an example of a memory module in accordance with system 100, system 200, system 300, or system 400. System 508 illustrates IDE engines as a separate component of the memory module.

System 508 illustrates DRAM 528, which represents memory devices or DRAM devices to store system data. DB 518 represent data buffers that buffer the data bus between the host and the memory module. Data 578 represents the data bus or data buses for system 508. CMD (command) 588 represents a command bus from the host to the memory module. In one example, system 508 includes DB 518 to buffer data 578 between DRAM 528 and the host.

System 508 represents an example of a buffered DIMM where link protection provides integrity and replay protection for data in transit between the host and the memory devices. The link protection can be referred to as DDR IDE, referring to integrity and data encryption for a double data rate data channel. In one example, the DDR IDE applies AES-GMAC or another AES-CTR algorithm.

In one example, the memory controller of the host encrypts the data with MKTME to provide data at rest protection, and the DDR IDE does not need to perform additional encryption. System 508 can generate integrity tag or MAC information to verify the integrity of the data transmission.

In one example, RCD 538 includes IDE engine 568 or a crypto engine to perform link decryption of CMD 588 for command and address information. In one example, RCD 538 also handles control signals, which allows simpler mapping of functions. In one example, the memory module includes IDE engine 558 or crypto engines implemented as separate components on the memory module. In one example, IDE engine 558 is a separate link decryption chip on the module for write data. In one example, IDE engine 556 represents a link encryption chip on the module for read data. The link decryption or encryption chip can be common to DRAMs 528.

In one example, IDE engine 558 is implemented as a component across an entire bus or across an entire cacheline. Thus, IDE engine 558 can provide crypto functions for multiple parallel devices of the memory module. IDE engine 558 performs link protection/decryption of data 578 for write data. In one example, IDE engine 558 can provide link protection/encryption for read data to send back to the memory controller. In one example, IDE engine 558 is implemented as an intermediate component between DRAM 528 and DB 518. It will be understood that use of an intermediate component for the IDE engine is likely to introduce additional memory latency as well as increasing component count and module cost.

In one example, SPD hub 548 provides a center for key exchange. Thus, SPD hub 548 can manage the key exchange, and IDE engine 558 can implement the cryptography based on the keys provided. In one example, SPD hub 548 provides key information to RCD 538, which can propagate the keys to IDE engine 558.

Figure 6A:
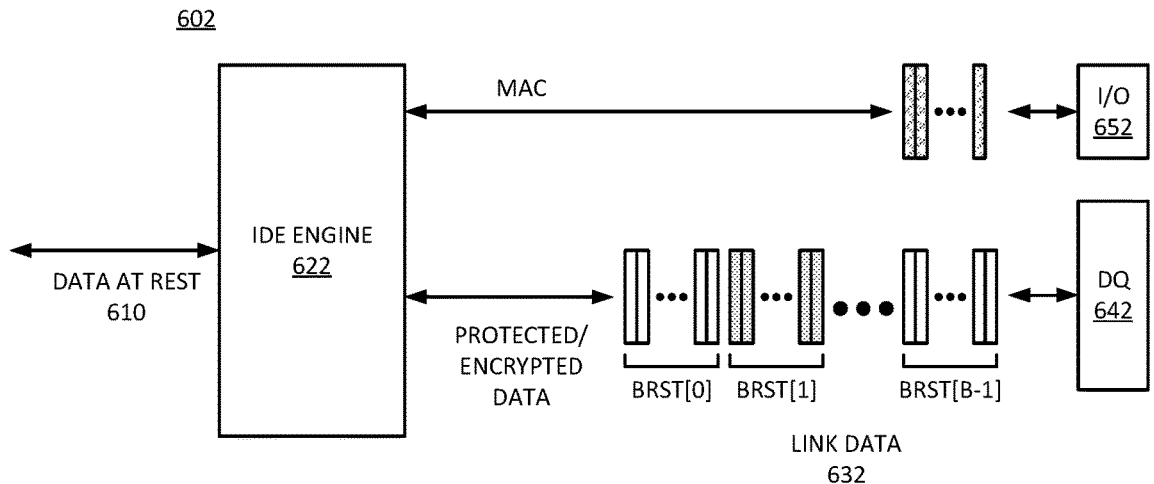
FIG. 6A is a block diagram of an example of link protection with a MAC sent on a separate I/O signal line.

FIG. 6A is a block diagram of an example of link protection with a MAC sent on a separate I/O signal line. Link protection 602 represents link protection where the IDE engine generates MAC information that is sent over a signal line separate from the data bus. Link protection 602 can be used with a system in accordance with system 100, system 200, system 300, or system 400.

Data at rest 610 represents the source data, which can be encrypted data or unencrypted data. IDE engine 622 represents an example of a crypto engine that can generate MAC information for link encryption. In one example, IDE engine 622 encrypts data at rest 610. In one example, IDE engine 622 does not encrypt the data itself, but generates the cryptographic check information (e.g., a MAC or integrity tag) to encrypt the data link. For data that is already encrypted, encryption information for the link can be sufficient to provide security to the data in transit.

In one example, IDE engine 622 generates a MAC and encrypted data. In one example, the data is already encrypted data and the IDE engine generates the MAC without again encrypting the data. Thus, the data is represented as protected/encrypted data, referring to the protection of the link, the encryption of the data, and the optional encryption of the link. In one example, due to the size of the MAC used in link protection 602, the MAC is accumulated over multiple bursts of data, identified as BRST[0:B-1]. The B bursts can represent the number of data bursts to which the MAC applies, over which the MAC is computed.

In one example, the MAC has a portion of data for each burst. The bursts represent a sequence of cycles or unit intervals in which link data 632 is transmitted for a single memory access transaction. In one example, the bits of the MAC are sent over multiple data transfer cycles, represented by the bursts of data.

With link protection 602, the MAC is sent over a signal line separate from the data of bursts BRST[0:B-1]. I/O 652 represents an interface to the signal line that is separate from the data bus. DQ 642 represents the data bus over which the encrypted data is transmitted, while the MAC is transmitted over I/O 652.

Figure 6B:
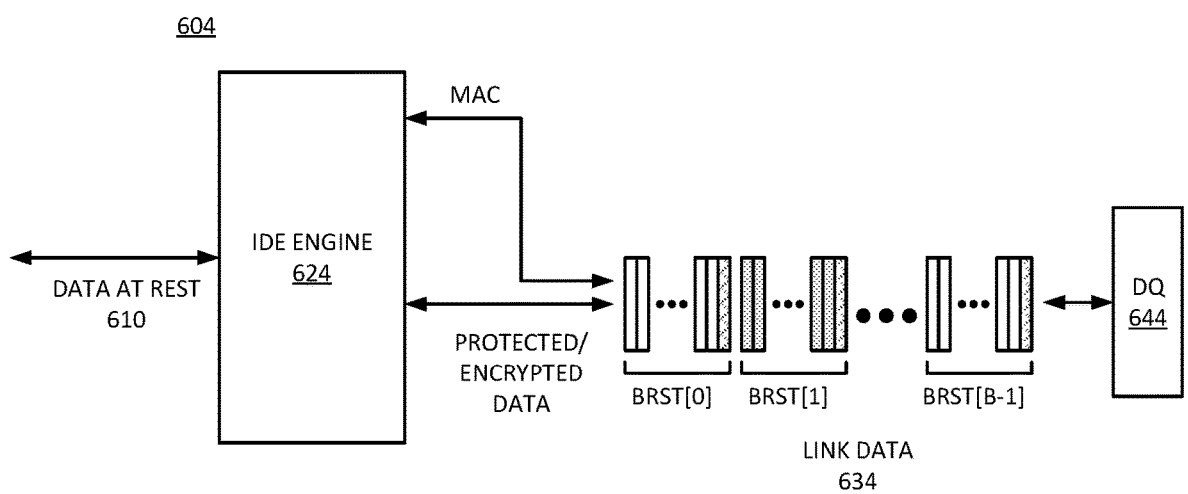
FIG. 6B is a block diagram of an example of link protection with a MAC sent inline with encrypted data.

FIG. 6B is a block diagram of an example of link encryption with a MAC sent inline with encrypted data. Link protection 604 represents link encryption where the IDE engine generates MAC information that is sent inline with the data. Link protection 604 can be used with a system in accordance with system 100, system 200, system 300, or system 400.

Data at rest 610 represents the source data, which can be encrypted data or unencrypted data. IDE engine 624 represents an example of a crypto engine that can generate MAC information for link encryption. In one example, IDE engine 624 encrypts data at rest 610. In one example, IDE engine 624 does not encrypt the data itself, but generates the cryptographic check information (e.g., a MAC or integrity tag) to encrypt the data link. For data that is already encrypted, encryption information for the link can be sufficient to provide security to the data in transit.

In one example, IDE engine 624 generates a MAC and encrypted data. In one example, the data is already encrypted data and the IDE engine generates the MAC without again encrypting the data. Thus, the data is represented as protected/encrypted data, referring to the protection of the link, the encryption of the data, and the optional encryption of the link. In one example, due to the size of the MAC used in link protection 604, the MAC is accumulated over multiple bursts of data, identified as BRST[0:B-1]. The B bursts can represent the number of data bursts to which the MAC applies, over which the MAC is computed.

In one example, the MAC has a portion of data for each burst. The bursts represent a sequence of cycles or unit intervals in which link data 634 is transmitted for a single memory access transaction. In one example, the bits of the MAC are sent over multiple data transfer cycles, represented by the bursts of data.

With link protection 604, the MAC is sent with the data. In one example, sending the MAC information with the data includes extending the length of each data burst to allow for the transmission of the MAC information. DQ 644 represents the data bus over which the encrypted data is transmitted along with the MAC information.

Figure 7:
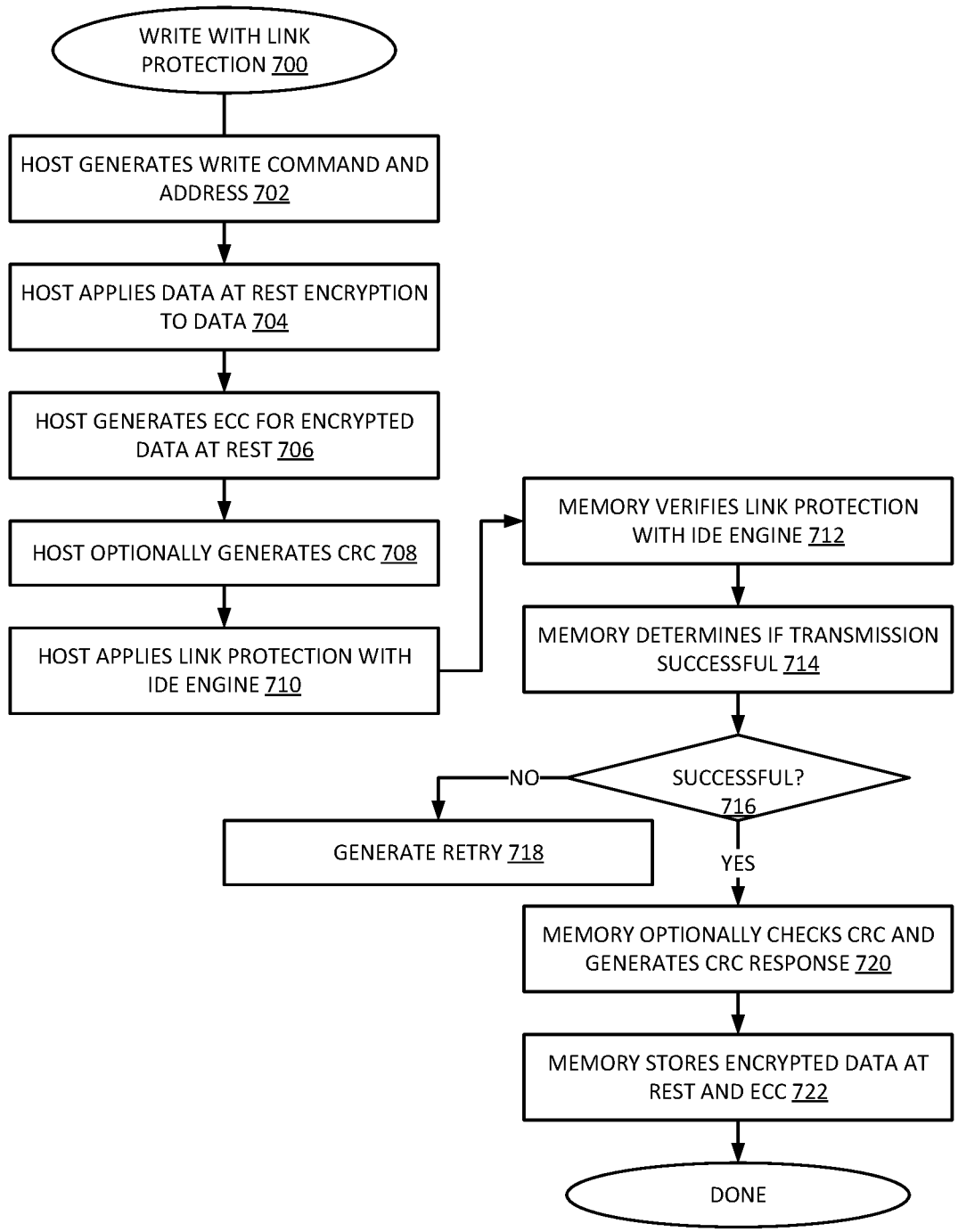
FIG. 7 is a flow diagram of an example of a process for writing data to system memory with link protection.

FIG. 7 is a flow diagram of an example of a process for writing data to system memory with link protection. Process 700 represents a process to perform a write with link protection.

The host generates a write command with an associated address, at 702. In one example, the host applies data at rest encryption on the data, at 704. The application of data at rest encryption is optional. The host generates ECC for the data at rest. Thus, in one example, the host generates ECC for the encrypted data at rest, at 706.

The host optionally generates CRC for the data for transmission error checking, at 708. The host applies link protection with an IDE engine on the data at rest and its associated ECC data that will be transmitted to the memory, at 710. The memory receives the protected link data and verifies the link protection with an IDE engine, at 712. The IDE engine can be an engine in a data buffer, in the memory devices, or in intermediate components on the memory module.

The memory can determine if the protected transmission is successful, at 714. If there is an error detected in the link protection, the protected transmission is unsuccessful, at 716 NO branch, the memory can generate a retry to the memory controller to resend the protected transmission, at 718. In one example, if there are multiple failed attempts, the retry request can trigger the changing of the encryption key to try again with a new key applied.

If there are no errors detected in the link protection, the protected transmission is successful, at 716 YES branch, and in one example, the memory optionally checks the CRC and generates a CRC response as needed, at 720. After successfully checking the link protection and optionally decrypting link encryption, the memory can recover the protected data and ECC bits and then store the encrypted data at rest and its ECC, at 722.

Figure 8:
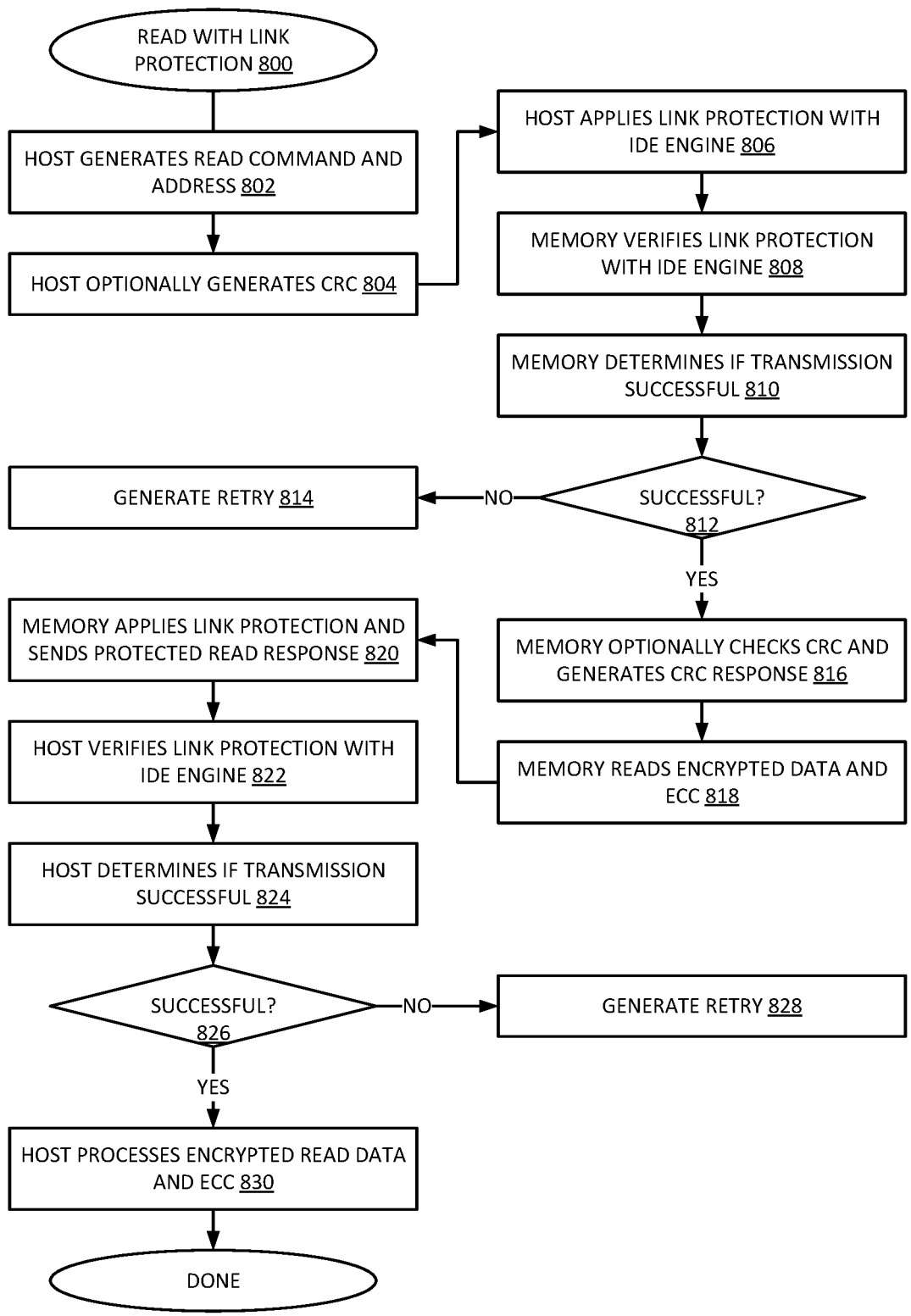
FIG. 8 is a flow diagram of an example of a process for reading data from system memory with link protection.

FIG. 8 is a flow diagram of an example of a process for reading data from system memory with link protection. Process 800 represents a process to perform a read with link protection.

The host generates a read command with an associated address, at 802. In one example, the host optionally generates CRC for the data for transmission error checking, at

804. In one example, the host applies link protection with an IDE engine on the command and data information with an IDE engine, at 806. The memory receives the command and address. In one example, the memory verifies the link protection for the command with an IDE engine, at 808. The IDE engine can be an engine in an RCD.

The memory can determine if the protected transmission is successful, at 810. If there is an error detected in the link protection, the protected transmission is not successful, at 812 NO branch, and the memory can generate a retry to the memory controller to resend the protected transmission, at 814. In one example, if there are multiple failed attempts, the retry request can trigger the changing of the encryption key to try again with a new key applied.

If there are no errors detected in the link protection, the protected transmission is successful, at 812 YES branch, and in one example, the memory optionally checks the CRC and generates a CRC response as needed, at 816. The memory can then read the encrypted data at rest and its ECC from the target address, at 818.

In one example, the memory applies link protection on the data to send back to the memory controller. Thus, the memory can apply link protection and send a protected read response, at 820. The host receives the read data and verifies the link protection with an IDE engine, at 822.

The host can determine if the protected transmission is successful, at 824. If there is an error detected in the link protection, the protected transmission is not successful, at 826 NO branch, and the memory controller can generate a retry to the memory, at 828. If there are no errors detected in the link protection, the protected transmission is successful, at 826 YES branch, and in one example, the memory controller can recover the protected data and ECC and process the read data and its ECC, at 830.

Figure 9:
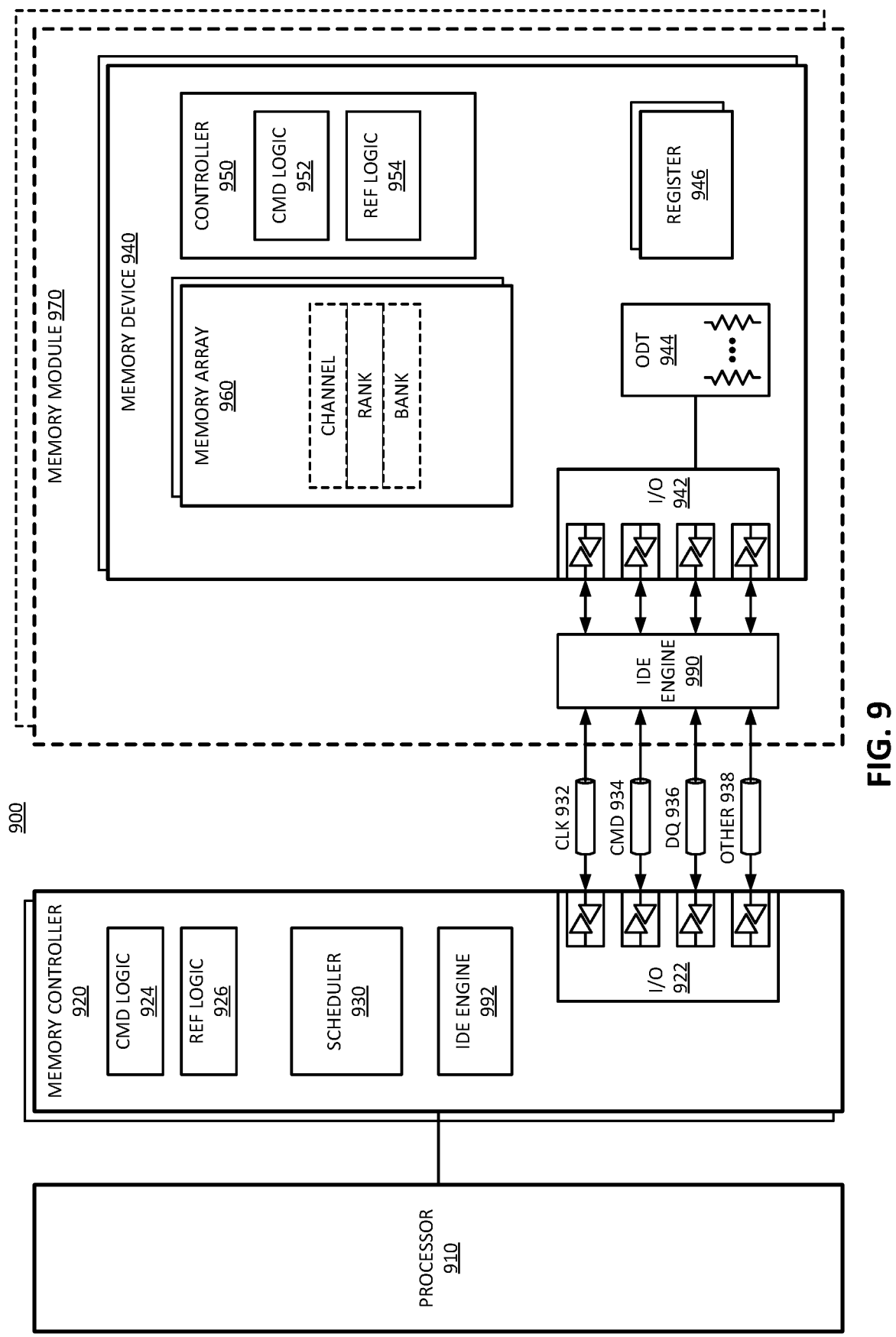
FIG. 9 is a block diagram of an example of a memory subsystem in which system memory link protection can be implemented.

FIG. 9 is a block diagram of an example of a memory subsystem in which system memory link protection can be implemented. System 900 includes a processor and elements of a memory subsystem in a computing device. System 900 represents a system in accordance with an example of system 100, system 200, system 300, or system 400.

In one example, memory controller 920 includes IDE engine 992 to perform protected data exchange with memory device 940. The protected data exchange can be link protection in accordance with any example described. In one example, memory module 970 includes IDE engine 990 for link protection with memory controller 920 in accordance with any example described. In one example, IDE engine 990 is part of memory device 940. In one example, IDE engine 990 is a standalone component of memory module 970. In one example, IDE engine 990 is part of a data buffer (not shown) of memory module 970.

Processor 910 represents a processing unit of a computing platform that may execute an operating system (OS) and applications, which can collectively be referred to as the host or the user of the memory. The OS and applications execute operations that result in memory accesses. Processor 910 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 900 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 920 represents one or more memory controller circuits or devices for system 900. Memory controller 920 represents control logic that generates memory access commands in response to the execution of operations by processor 910. Memory controller 920 accesses one or more memory devices 940. Memory devices 940 can be DRAM devices in accordance with any referred to above. In one example, memory devices 940 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 920 manages a separate memory channel, although system 900 can be configured to have multiple channels managed by a single controller, or to have multiple controllers on a single channel. In one example, memory controller 920 is part of host processor 910, such as logic implemented on the same die or implemented in the same package space as the processor.

Memory controller 920 includes I/O interface logic 922 to couple to a memory bus, such as a memory channel as referred to above. I/O interface logic 922 (as well as I/O interface logic 942 of memory device 940) can include pins, pads, connectors, signal lines, traces, or wires, or other hardware to connect the devices, or a combination of these.

I/O interface logic 922 can include a hardware interface. As illustrated, I/O interface logic 922 includes at least drivers/transceivers for signal lines. Commonly, wires within an integrated circuit interface couple with a pad, pin, or connector to interface signal lines or traces or other wires between devices. I/O interface logic 922 can include drivers, receivers, transceivers, or termination, or other circuitry or combinations of circuitry to exchange signals on the signal lines between the devices. The exchange of signals includes at least one of transmit or receive. While shown as coupling I/O 922 from memory controller 920 to I/O 942 of memory device 940, it will be understood that in an implementation of system 900 where groups of memory devices 940 are accessed in parallel, multiple memory devices can include I/O interfaces to the same interface of memory controller 920. In an implementation of system 900 including one or more memory modules 970, I/O 942 can include interface hardware of the memory module in addition to interface hardware on the memory device itself. Other memory controllers 920 will include separate interfaces to other memory devices 940.

The bus between memory controller 920 and memory devices 940 can be implemented as multiple signal lines coupling memory controller 920 to memory devices 940. The bus may typically include at least clock (CLK) 932, command/address (CMD) 934, and write data (DQ) and read data (DQ) 936, and zero or more other signal lines 938. In one example, a bus or connection between memory controller 920 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 900 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 920 and memory devices 940. An example of a serial bus technology is 86106 encoding and transmission of high-speed data with embedded clock over a single differential pair of signals in each direction. In one example, CMD 934 represents signal lines shared in parallel with multiple memory devices. In one example, multiple memory devices share encoding command signal lines of CMD 934, and each has a separate chip select (CS_n) signal line to select individual memory devices.

It will be understood that in the example of system 900, the bus between memory controller 920 and memory devices 940 includes a subsidiary command bus CMD 934 and a subsidiary bus to carry the write and read data, DQ 936. In one example, the data bus can include bidirectional lines for read data and for write/command data. In another example, the subsidiary bus DQ 936 can include unidirectional write signal lines for write and data from the host to memory, and can include unidirectional lines for read data from the memory to the host. In accordance with the chosen memory technology and system design, other signals 938 may accompany a bus or sub bus, such as strobe lines DQS. Based on design of system 900, or implementation if a design supports multiple implementations, the data bus can have more or less bandwidth per memory device 940. For example, the data bus can support memory devices that have either a x4 interface, a x8 interface, a x16 interface, or other interface. The convention "xW," where W is an integer that refers to an interface size or width of the interface of memory device 940, which represents a number of signal lines to exchange data with memory controller 920. The interface size of the memory devices is a controlling factor on how many memory devices can be used concurrently per channel in system 900 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 940 and memory controller 920 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 940 can transfer data on each UI. Thus, a x8 memory device operating on BL8 can transfer 94 bits of data (8 data signal lines times 8 data bits transferred per line over the burst). It will be understood that this simple example is merely an illustration and is not limiting.

Memory devices 940 represent memory resources for system 900. In one example, each memory device 940 is a separate memory die. In one example, each memory device 940 can interface with multiple (e.g., 2) channels per device or die. Each memory device 940 includes I/O interface logic 942, which has a bandwidth determined by the implementation of the device (e.g., x16 or x8 or some other interface bandwidth). I/O interface logic 942 enables the memory devices to interface with memory controller 920. I/O interface logic 942 can include a hardware interface, and can be in accordance with I/O 922 of memory controller, but at the memory device end. In one example, multiple memory devices 940 are connected in parallel to the same command and data buses. In another example, multiple memory devices 940 are connected in parallel to the same command bus, and are connected to different data buses. For example, system 900 can be configured with multiple memory devices 940 coupled in parallel, with each memory device responding to a command, and accessing memory resources 960 internal to each. For a Write operation, an individual memory device 940 can write a portion of the overall data word, and for a Read operation, an individual memory device 940 can fetch a portion of the overall data word. The remaining bits of the word will be provided or received by other memory devices in parallel.

In one example, memory devices 940 are disposed directly on a motherboard or host system platform (e.g., a PCB (printed circuit board) on which processor 910 is disposed) of a computing device. In one example, memory devices 940 can be organized into memory modules 970. In one example, memory modules 970 represent dual inline memory modules (DIMMs). In one example, memory modules 970 represent other organization of multiple memory devices to share at least a portion of access or control circuitry, which can be a separate circuit, a separate device, or a separate board from the host system platform. Memory modules 970 can include multiple memory devices 940, and the memory modules can include support for multiple separate channels to the included memory devices disposed on them. In another example, memory devices 940 may be incorporated into the same package as memory controller 920, such as by techniques such as multi-chip-module (MCM), package-on-package, through-silicon via (TSV), or other techniques or combinations. Similarly, in one example, multiple memory devices 940 may be incorporated into memory modules 970, which themselves may be incorporated into the same package as memory controller 920. It will be appreciated that for these and other implementations, memory controller 920 may be part of host processor 910.

Memory devices 940 each include one or more memory arrays 960. Memory array 960 represents addressable memory locations or storage locations for data. Typically, memory array 960 is managed as rows of data, accessed via wordline (rows) and bitline (individual bits within a row) control. Memory array 960 can be organized as separate channels, ranks, and banks of memory. Channels may refer to independent control paths to storage locations within memory devices 940. Ranks may refer to common locations across multiple memory devices (e.g., same row addresses within different devices) in parallel. Banks may refer to sub-arrays of memory locations within a memory device 940. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 940 include one or more registers 944. Register 944 represents one or more storage devices or storage locations that provide configuration or settings for the operation of the memory device. In one example, register 944 can provide a storage location for memory device 940 to store data for access by memory controller 920 as part of a control or management operation. In one example, register 944 includes one or more Mode Registers. In one example, register 944 includes one or more multipurpose registers. The configuration of locations within register 944 can configure memory device 940 to operate in different "modes," where command information can trigger different operations within memory device 940 based on the mode. Additionally or in the alternative, different modes can also trigger different operation from address information or other signal lines depending on the mode. Settings of register 944 can indicate configuration for I/O settings (e.g., timing, termination or ODT (on-die termination) 946, driver configuration, or other I/O settings).

In one example, memory device 940 includes ODT 946 as part of the interface hardware associated with I/O 942. ODT 946 can be configured as mentioned above, and provide settings for impedance to be applied to the interface to specified signal lines. In one example, ODT 946 is applied to DQ signal lines. In one example, ODT 946 is applied to command signal lines. In one example, ODT 946 is applied to address signal lines. In one example, ODT 946 can be applied to any combination of the preceding. The ODT settings can be changed based on whether a memory device is a selected target of an access operation or a non-target device. ODT 946 settings can affect the timing and reflections of signaling on the terminated lines. Careful control over ODT 946 can enable higher-speed operation with improved matching of applied impedance and loading. ODT 946 can be applied to specific signal lines of I/O interface 942, 922 (for example, ODT for DQ lines or ODT for CA lines), and is not necessarily applied to all signal lines.

Memory device 940 includes controller 950, which represents control logic within the memory device to control internal operations within the memory device. For example, controller 950 decodes commands sent by memory controller 920 and generates internal operations to execute or satisfy the commands. Controller 950 can be referred to as an internal controller, and is separate from memory controller 920 of the host. Controller 950 can determine what mode is selected based on register 944, and configure the internal execution of operations for access to memory resources 960 or other operations based on the selected mode. Controller 950 generates control signals to control the routing of bits within memory device 940 to provide a proper interface for the selected mode and direct a command to the proper memory locations or addresses. Controller 950 includes command logic 952, which can decode command encoding received on command and address signal lines. Thus, command logic 952 can be or include a command decoder. With command logic 952, memory device can identify commands and generate internal operations to execute requested commands.

Referring again to memory controller 920, memory controller 920 includes command (CMD) logic 924, which represents logic or circuitry to generate commands to send to memory devices 940. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 940, memory controller 920 can issue commands via I/O 922 to cause memory device 940 to execute the commands. In one example, controller 950 of memory device 940 receives and decodes command and address information received via I/O 942 from memory controller 920. Based on the received command and address information, controller 950 can control the timing of operations of the logic and circuitry within memory device 940 to execute the commands. Controller 950 is responsible for compliance with standards or specifications within memory device 940, such as timing and signaling requirements. Memory controller 920 can implement compliance with standards or specifications by access scheduling and control.

Memory controller 920 includes scheduler 930, which represents logic or circuitry to generate and order transactions to send to memory device 940. From one perspective, the primary function of memory controller 920 could be said to schedule memory access and other transactions to memory device 940. Such scheduling can include generating the transactions themselves to implement the requests for data by processor 910 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 920 typically includes logic such as scheduler 930 to allow selection and ordering of transactions to improve performance of system 900. Thus, memory controller 920 can select which of the outstanding transactions should be sent to memory device 940 in which order, which is typically achieved with logic much more complex that a simple first-in first-out algorithm. Memory controller 920 manages the transmission of the transactions to memory device 940, and manages the timing associated with the transaction. In one example, transactions have deterministic timing, which can be managed by memory controller 920 and used in determining how to schedule the transactions with scheduler 930.

In one example, memory controller 920 includes refresh (REF) logic 926. Refresh logic 926 can be used for memory resources that are volatile and need to be refreshed to retain a deterministic state. In one example, refresh logic 926 indicates a location for refresh, and a type of refresh to perform. Refresh logic 926 can trigger self-refresh within memory device 940, or execute external refreshes which can be referred to as auto refresh commands) by sending refresh commands, or a combination. In one example, controller 950 within memory device 940 includes refresh logic 954 to apply refresh within memory device 940. In one example, refresh logic 954 generates internal operations to perform refresh in accordance with an external refresh received from memory controller 920. Refresh logic 954 can determine if a refresh is directed to memory device 940, and what memory resources 960 to refresh in response to the command.

Figure 10:
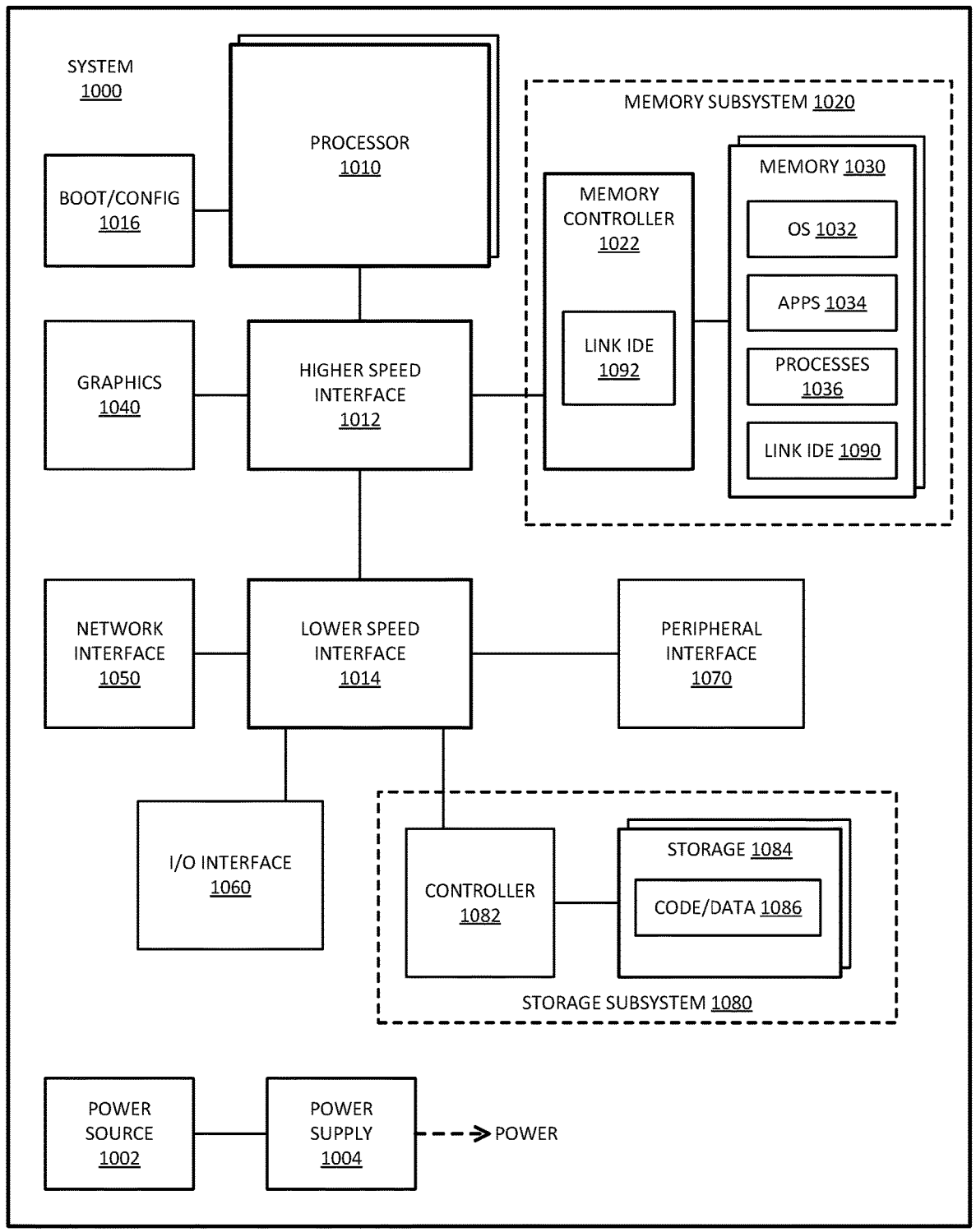
FIG. 10 is a block diagram of an example of a computing system in which system memory link protection can be implemented.

FIG. 10 is a block diagram of an example of a computing system in which system memory link protection can be implemented. System 1000 represents a computing device in accordance with any example herein, and can be a laptop computer, a desktop computer, a tablet computer, a server, a gaming or entertainment control system, embedded computing device, or other electronic device.

System 1000 represents a system in accordance with an example of system 100, system 200, system 300, or system 400. In one example, memory controller 1022 includes link IDE 1092 to perform protected data exchange with memory 1030. The protected data exchange can be link protection in accordance with any example described. In one example, memory 1030 includes link IDE 1090 for link protection with memory controller 1022 in accordance with any example described. In one example, link IDE 1090 is part of a memory device of memory 1030. In one example, link IDE 1090 is a standalone component of a memory module of memory 1030. In one example, link IDE 1090 is part of a data buffer (not shown) of a memory module of memory 1030.

System 1000 includes processor 1010 can include any type of microprocessor, central processing unit (CPU), graphics processing unit (GPU), processing core, or other processing hardware, or a combination, to provide processing or execution of instructions for system 1000. Processor 1010 can be a host processor device. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1000 includes boot/config 1016, which represents storage to store boot code (e.g., basic input/output system (BIOS)), configuration settings, security hardware (e.g., trusted platform module (TPM)), or other system level hardware that operates outside of a host OS. Boot/config 1016 can include a nonvolatile storage device, such as read-only memory (ROM), flash memory, or other memory devices.

In one example, system 1000 includes interface 1012 coupled to processor 1010, which can represent a higher speed interface or a high throughput interface for system components that need higher bandwidth connections, such as memory subsystem 1020 or graphics interface components 1040. Interface 1012 represents an interface circuit, which can be a standalone component or integrated onto a processor die. Interface 1012 can be integrated as a circuit onto the processor die or integrated as a component on a system on a chip. Where present, graphics interface 1040 interfaces to graphics components for providing a visual display to a user of system 1000. Graphics interface 1040 can be a standalone component or integrated onto the processor die or system on a chip. In one example, graphics interface 1040 can drive a high definition (HD) display or ultra high definition (UHD) display that provides an output to a user. In one example, the display can include a touchscreen display. In one example, graphics interface 1040 generates a display based on data stored in memory 1030 or based on operations executed by processor 1010 or both.

Memory subsystem 1020 represents the main memory of system 1000, and provides storage for code to be executed by processor 1010, or data values to be used in executing a routine. Memory subsystem 1020 can include one or more varieties of random-access memory (RAM) such as DRAM, 3DXP (three-dimensional crosspoint), or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010, such as integrated onto the processor die or a system on a chip.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1000 includes interface 1014, which can be coupled to interface 1012. Interface 1014 can be a lower speed interface than interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can exchange data with a remote device, which can include sending data stored in memory or receiving data to be stored in memory.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, NAND, 3DXP, or optical based disks, or a combination. Storage 1084 holds code or instructions and data 1086 in a persistent state (i.e., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to system 1000). In one example, storage subsystem 1080 includes controller 1082 to interface with storage 1084. In one example controller 1082 is a physical part of interface 1014 or processor 1010, or can include circuits or logic in both processor 1010 and interface 1014.

Power source 1002 provides power to the components of system 1000. More specifically, power source 1002 typically interfaces to one or multiple power supplies 1004 in system 1000 to provide power to the components of system 1000. In one example, power supply 1004 includes an AC to DC (alternating current to direct current) adapter to plug into a wall outlet. Such AC power can be renewable energy (e.g., solar power) power source 1002. In one example, power source 1002 includes a DC power source, such as an external AC to DC converter. In one example, power source 1002 or power supply 1004 includes wireless charging hardware to charge via proximity to a charging field. In one example, power source 1002 can include an internal battery or fuel cell source.

Figure 11:
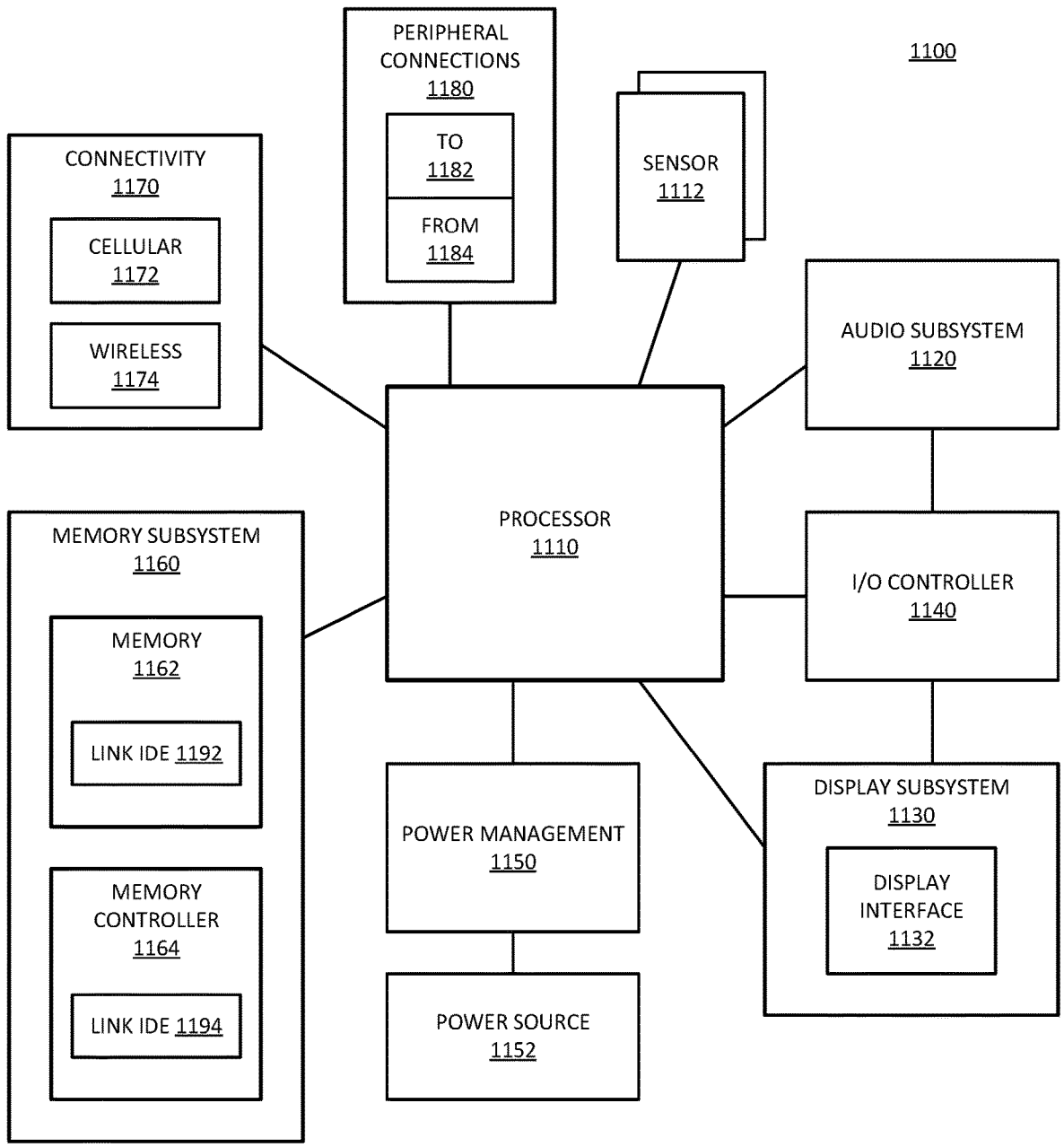
FIG. 11 is a block diagram of an example of a mobile device in which system memory link protection can be implemented.

FIG. 11 is a block diagram of an example of a mobile device in which system memory link protection can be implemented. System 1100 represents a mobile computing device, such as a computing tablet, a mobile phone or smartphone, wearable computing device, or other mobile device, or an embedded computing device. It will be understood that certain of the components are shown generally, and not all components of such a device are shown in system 1100.

System 1100 represents a system in accordance with an example of system 100, system 200, system 300, or system 400. In one example, memory controller 1164 includes link IDE 1194 to perform protected data exchange with memory 1162. The protected data exchange can be link protection in accordance with any example described. In one example, memory 1030 includes link IDE 1192 for link protection with memory controller 1164 in accordance with any example described. In one example, link IDE 1192 is part of a memory device of memory 1162. In one example, link IDE 1192 is a standalone component of a memory module of memory 1162. In one example, link IDE 1192 is part of a data buffer (not shown) of a memory module of memory 1162.

System 1100 includes processor 1110, which performs the primary processing operations of system 1100. Processor 1110 can be a host processor device. Processor 1110 can include one or more physical devices, such as microprocessors, application processors, microcontrollers, programmable logic devices, or other processing means. The processing operations performed by processor 1110 include the execution of an operating platform or operating system on which applications and device functions are executed. The processing operations include operations related to I/O (input/output) with a human user or with other devices, operations related to power management, operations related to connecting system 1100 to another device, or a combination. The processing operations can also include operations related to audio I/O, display I/O, or other interfacing, or a combination. Processor 1110 can execute data stored in memory. Processor 1110 can write or edit data stored in memory.

In one example, system 1100 includes one or more sensors 1112. Sensors 1112 represent embedded sensors or interfaces to external sensors, or a combination. Sensors 1112 enable system 1100 to monitor or detect one or more conditions of an environment or a device in which system 1100 is implemented. Sensors 1112 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1112 can also include sensors for biometric systems such as fingerprint recognition systems, face detection or recognition systems, or other systems that detect or recognize user features. Sensors 1112 should be understood broadly, and not limiting on the many different types of sensors that could be implemented with system 1100. In one example, one or more sensors 1112 couples to processor 1110 via a frontend circuit integrated with processor 1110. In one example, one or more sensors 1112 couples to processor 1110 via another component of system 1100.

In one example, system 1100 includes audio subsystem 1120, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 1100, or connected to system 1100. In one example, a user interacts with system 1100 by providing audio commands that are received and processed by processor 1110.

Display subsystem 1130 represents hardware (e.g., display devices) and software components (e.g., drivers) that provide a visual display for presentation to a user. In one example, the display includes tactile components or touchscreen elements for a user to interact with the computing device. Display subsystem 1130 includes display interface 1132, which includes the particular screen or hardware device used to provide a display to a user. In one example, display interface 1132 includes logic separate from processor 1110 (such as a graphics processor) to perform at least some processing related to the display. In one example, display subsystem 1130 includes a touchscreen device that provides both output and input to a user. In one example, display subsystem 1130 includes a high definition (HD) or ultra-high definition (UHD) display that provides an output to a user. In one example, display subsystem includes or drives a touchscreen display. In one example, display subsystem 1130 generates display information based on data stored in memory or based on operations executed by processor 1110 or both.

I/O controller 1140 represents hardware devices and software components related to interaction with a user. I/O controller 1140 can operate to manage hardware that is part of audio subsystem 1120, or display subsystem 1130, or both. Additionally, I/O controller 1140 illustrates a connection point for additional devices that connect to system 1100 through which a user might interact with the system. For example, devices that can be attached to system 1100 might include microphone devices, speaker or stereo systems, video systems or other display device, keyboard or keypad devices, buttons/switches, or other I/O devices for use with specific applications such as card readers or other devices.

As mentioned above, I/O controller 1140 can interact with audio subsystem 1120 or display subsystem 1130 or both. For example, input through a microphone or other audio device can provide input or commands for one or more applications or functions of system 1100. Additionally, audio output can be provided instead of or in addition to display output. In another example, if display subsystem includes a touchscreen, the display device also acts as an input device, which can be at least partially managed by I/O controller 1140. There can also be additional buttons or switches on system 1100 to provide I/O functions managed by I/O controller 1140.

In one example, I/O controller 1140 manages devices such as accelerometers, cameras, light sensors or other environmental sensors, gyroscopes, global positioning system (GPS), or other hardware that can be included in system 1100, or sensors 1112. The input can be part of direct user interaction, as well as providing environmental input to the system to influence its operations (such as filtering for noise, adjusting displays for brightness detection, applying a flash for a camera, or other features).

In one example, system 1100 includes power management 1150 that manages battery power usage, charging of the battery, and features related to power saving operation. Power management 1150 manages power from power source 1152, which provides power to the components of system 1100. In one example, power source 1152 includes an AC to DC (alternating current to direct current) adapter to plug into a wall outlet. Such AC power can be renewable energy (e.g., solar power, motion based power). In one example, power source 1152 includes only DC power, which can be provided by a DC power source, such as an external AC to DC converter. In one example, power source 1152 includes wireless charging hardware to charge via proximity to a charging field. In one example, power source 1152 can include an internal battery or fuel cell source.

Memory subsystem 1160 includes memory device(s) 1162 for storing information in system 1100. Memory subsystem 1160 can include nonvolatile (state does not change if power to the memory device is interrupted) or volatile (state is indeterminate if power to the memory device is interrupted) memory devices, or a combination. Memory 1160 can store application data, user data, music, photos, documents, or other data, as well as system data (whether long-term or temporary) related to the execution of the applications and functions of system 1100. In one example, memory subsystem 1160 includes memory controller 1164 (which could also be considered part of the control of system 1100, and could potentially be considered part of processor 1110). Memory controller 1164 includes a scheduler to generate and issue commands to control access to memory device 1162.

Connectivity 1170 includes hardware devices (e.g., wireless or wired connectors and communication hardware, or a combination of wired and wireless hardware) and software components (e.g., drivers, protocol stacks) to enable system 1100 to communicate with external devices. The external device could be separate devices, such as other computing devices, wireless access points or base stations, as well as peripherals such as headsets, printers, or other devices. In one example, system 1100 exchanges data with an external device for storage in memory or for display on a display device. The exchanged data can include data to be stored in memory, or data already stored in memory, to read, write, or edit data.

Connectivity 1170 can include multiple different types of connectivity. To generalize, system 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 1174 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1180 include hardware interfaces and connectors, as well as software components (e.g., drivers, protocol stacks) to make peripheral connections. It will be understood that system 1100 could both be a peripheral device ("to" 1182) to other computing devices, as well as have peripheral devices ("from" 1184) connected to it. System 1100 commonly has a "docking" connector to connect to other computing devices for purposes such as managing (e.g., downloading, uploading, changing, synchronizing) content on system 1100. Additionally, a docking connector can allow system 1100 to connect to certain peripherals that allow system 1100 to control content output, for example, to audiovisual or other systems.

In addition to a proprietary docking connector or other proprietary connection hardware, system 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example a memory module includes: a link decryption engine to receive write data from a memory controller, the write data having encrypted protected data and error checking and correction (ECC) data for the encrypted protected data, the write data having link protection on the write data, the link decryption engine to further receive a link integrity tag associated with the link protection, wherein the link decryption engine is to perform link integrity check with the link integrity tag; and memory devices to store the protected data and ECC data from the link decryption engine.

In one example of the memory module, the memory devices each include a link decryption engine to perform the link integrity check with the link integrity tag locally to the memory devices. In accordance with any preceding example of the memory module, in one example, the memory module includes: data buffers to buffer data for the memory devices; wherein the data buffers each include a link decryption engine to perform the link integrity check with the link integrity tag for a specific memory device. In accordance with any preceding example of the memory module, in one example, the memory module includes: a link decryption chip as the link decryption engine for the memory devices. In accordance with any preceding example of the memory module, in one example, the memory module comprises a link decryption chip for each memory device, wherein a specific link decryption chip is to perform the link integrity check with the link integrity tag for a specific memory device. In accordance with any preceding example of the memory module, in one example, the memory module includes: a registering clock driver (RCD) to receive command and address information for the memory devices; wherein the command and address information having the link protection; wherein the RCD includes a link decryption engine to perform link integrity check with the link integrity tag. In accordance with any preceding example of the memory module, in one example, the link protection comprises an implementation of advanced encryption standard with Galois message authentication code (AES-GMAC). In accordance with any preceding example of the memory module, in one example, the memory module includes the write data to have link encryption, wherein the link decryption engine is to decrypt the link encryption. In accordance with any preceding example of the memory module, in one example, the link encryption comprises an implementation of advanced encryption standard (AES) in counter mode. In accordance with any preceding example of the memory module, in one example, the implementation of AES in counter mode comprises an implementation of AES-GCM (advanced encryption standard in Galois/counter mode). In accordance with any preceding example of the memory module, in one example, the memory module includes: a registering clock driver (RCD) to receive command and address information for the memory devices; wherein the command and address information having the link encryption; wherein the RCD includes a link decryption engine to decrypt the link encryption.

In general with respect to the descriptions herein, in one example, a memory module includes: memory devices to store encrypted protected data and error checking and correction (ECC) data for the encrypted protected data; a link encryption engine to receive encrypted protected data and error checking and correction (ECC) data for the encrypted protected data from the memory devices as read data, the link encryption engine to generate link protection for transmission of the read data to a memory controller, including to generate a link integrity tag associated with the link protection; and I/O hardware to send the read data with the link protection and the link integrity tag to the memory controller.

In one example of the memory module, the memory devices each include a link encryption engine to generate the link protection and generate the link integrity tag locally to the memory devices. In accordance with any preceding example of the memory module, in one example, the memory module includes: data buffers to buffer data for the memory devices; wherein the data buffers each include a link encryption engine to generate the link protection and generate the link integrity tag for a specific memory device. In accordance with any preceding example of the memory module, in one example, the memory module includes: a link encryption chip as the link encryption engine for the memory devices. In accordance with any preceding example of the memory module, in one example, the memory module comprises a link encryption chip for each memory device, wherein a specific link encryption chip is to generate the link protection and generate the link integrity tag for a specific memory device. In accordance with any preceding example of the memory module, in one example, the link protection comprises an implementation of advanced encryption standard with Galois message authentication code (AES-GMAC). In accordance with any preceding example of the memory module, in one example, the memory module includes the link encryption engine to encrypt the read data. In accordance with any preceding example of the memory module, in one example, the link encryption comprises an implementation of advanced encryption standard (AES) in counter mode. In accordance with any preceding example of the memory module, in one example, the implementation of AES in counter mode comprises an implementation of AES-GCM (advanced encryption standard in Galois/counter mode).

In general with respect to the descriptions herein, in one example, a memory controller includes: I/O (input/output) hardware to couple to a memory module having memory devices; and a link encryption engine to generate link protection for transmission of write data to the memory devices, the write data having encrypted protected data and error checking and correction (ECC) data for the encrypted protected data, including to generate a link integrity tag associated with the link protection; wherein the I/O hardware is to send the write data with the link protection and the link integrity tag to the memory module; and wherein the memory module is to perform link integrity check with the link integrity tag and to store the protected data and ECC data in the memory devices.

In one example of the memory controller, the link encryption engine comprises a data link encryption engine, and further comprising: a command and address link encryption engine to generate command and address link protection on command and address information to send to the memory devices, including to generate a command and address link integrity tag associated with the command and address link protection; wherein the memory module includes a registering clock driver (RCD) to receive the command and address information for the memory devices with the command and address link protection and perform link integrity check with the command and address link integrity tag. In accordance with any preceding example of the memory controller, in one example, the link integrity tag comprises a message authentication code (MAC), wherein the I/O hardware is to send bits of the MAC over multiple data transfer cycles. In accordance with any preceding example of the memory controller, in one example, the link integrity tag comprises a message authentication code (MAC), wherein the I/O hardware is to send bits of the MAC over a signal line separate from a data bus or a command and address bus. In accordance with any preceding example of the memory controller, in one example, the protected data comprises data at rest protected with multikey total memory encryption (MKTME). In accordance with any preceding example of the memory controller, in one example, the link encryption engine is to perform link encryption on a new cryptographic key to the memory module, wherein after passing the new cryptographic key, the link encryption engine is to use the new cryptographic key for link encryption. In accordance with any preceding example of the memory controller, in one example, the memory controller includes the link encryption engine to encrypt the write data. In accordance with any preceding example of the memory controller, in one example, the link encryption comprises an implementation of advanced encryption standard (AES) in counter mode. In accordance with any preceding example of the memory controller, in one example, the implementation of AES in counter mode comprises an implementation of AES-GCM (advanced encryption standard in Galois/counter mode).

In general with respect to the descriptions herein, in one example, a memory controller includes: I/O (input/output) hardware to couple to a memory module having memory devices; and a link decryption engine to verify link protection on read data received from the memory devices, the read data having the link protection on encrypted protected data and error checking and correction (ECC) data for the encrypted protected data, the link decryption engine to verify the link protection with a link integrity tag associated with the link protection provided by the memory devices.

In one example of the memory controller, the protected data comprises data at rest protected with multikey total memory encryption (MKTME). In accordance with any preceding example of the memory controller, in one example, the memory controller includes the read data to have link encryption, wherein the link decryption engine is to decrypt the link encryption. In accordance with any preceding example of the memory controller, in one example, the link encryption comprises an implementation of advanced encryption standard (AES) in counter mode. In accordance with any preceding example of the memory controller, in one example, the implementation of AES in counter mode comprises an implementation of AES-GCM (advanced encryption standard in Galois/counter mode).

In general with respect to the descriptions herein, in one example, a computer system includes: a memory controller to perform data at rest encryption to generate encrypted protected data, perform error checking and correction (ECC) on the encrypted protected data to generate ECC bits, and generate link protection for the encrypted protected data and ECC bits, including to generate a link integrity tag associated with the link protection; a memory module coupled to the memory controller, the memory module to perform link integrity check with the link integrity tag to recover the encrypted protected data and ECC bits, wherein memory devices of the memory module are to store the encrypted protected data and ECC bits.

In one example of the computer system, the memory module is to perform the link integrity check with link decryption engines on the memory devices, or to perform the link integrity check with data buffers on the memory module that buffer data for the memory devices, or to perform the link integrity check with a link decryption chip of the memory module that is separate from the memory devices. In accordance with any preceding example of the computer system, in one example, the memory controller to perform encryption on the encrypted protected data and ECC bits, wherein the memory module is to decrypt the link encryption. In accordance with any preceding example of the computer system, in one example, the memory controller is to optionally perform the link encryption, wherein when the memory controller performs the link encryption, the memory controller is to forego performance of CRC (cyclic redundancy check) for transmission error checking. In accordance with any preceding example of the computer system, in one example, the memory module to generate link protection for encrypted protected data and ECC bits to send to the memory controller, including to generate a link integrity tag associated with the link protection; the memory controller to perform link integrity check with the link integrity tag to recover the encrypted protected data and ECC bits. In accordance with any preceding example of the computer system, in one example, the memory module to perform encryption on the encrypted protected data and ECC bits, wherein the memory controller is to decrypt the link encryption. In accordance with any preceding example of the computer system, in one example, the computer system includes: a basic input/output system (BIOS), wherein the BIOS is to trigger a secure mode during which the memory controller and the memory module perform a key exchange for link encryption and link decryption. In accordance with any preceding example of the computer system, in one example, the computer system includes one or more of: a multicore host processor coupled to the memory controller; a display communicatively coupled to a host processor; a network interface communicatively coupled to a host processor; or a battery to power the computer system.

In general with respect to the descriptions herein, in one example, a method includes: receiving write data from a memory controller, the write data having encrypted protected data and error checking and correction (ECC) data for the encrypted protected data, the write data having link protection on the write data; receiving a link integrity tag associated with the link protection; performing a link integrity check with the link integrity tag; and storing the protected data and ECC data in memory devices.

In one example of the method, performing the link integrity check with the link integrity tag is local to the memory devices. In accordance with any preceding example of the method, in one example, performing the link integrity check with the link integrity tag is performed at data buffers that buffer data for the memory devices. In accordance with any preceding example of the method, in one example, performing the link integrity check is performed at a link decryption chip. In accordance with any preceding example of the method, in one example, a memory module comprises a link decryption chip for each memory device. In accordance with any preceding example of the method, in one example, receiving command and address information for the memory devices, wherein the command and address information having the link protection; and performing a link integrity check with the link integrity tag on the command and address information. In accordance with any preceding example of the method, in one example, the command and address information has link encryption. In accordance with any preceding example of the method, in one example, the link protection comprises an implementation of advanced encryption standard with Galois message authentication code (AES-GMAC). In accordance with any preceding example of the method, in one example, the write data to have link encryption, wherein the link decryption engine is to decrypt the link encryption. In accordance with any preceding example of the method, in one example, the link encryption comprises an implementation of advanced encryption standard (AES) in counter mode. In accordance with any preceding example of the method, in one example, the implementation of AES in counter mode comprises an implementation of AES-GCM (advanced encryption standard in Galois/counter mode).

In general with respect to the descriptions herein, in one example, a method includes: accessing encrypted protected data and error checking and correction (ECC) data for the encrypted protected data from memory devices; generating link protection for transmission of the read data to a memory controller, including generating a link integrity tag associated with the link protection; and sending the read data with the link protection and the link integrity tag to the memory controller.

In one example of the method, generating the link protection and generating the link integrity tag occur locally to the memory devices. In accordance with any preceding example of the method, in one example, generating the link protection occurs at data buffers that buffer data for the memory devices. In accordance with any preceding example of the method, in one example, generating the link protection occurs at a link encryption chip. In accordance with any preceding example of the method, in one example, generating the link protection occurs at a link encryption chip that corresponds to a specific memory device. In accordance with any preceding example of the method, in one example, the link protection comprises an implementation of advanced encryption standard with Galois message authentication code (AES-GMAC). In accordance with any preceding example of the method, in one example, the method includes encrypting the read data. In accordance with any preceding example of the method, in one example, the link encryption comprises an implementation of advanced encryption standard (AES) in counter mode. In accordance with any preceding example of the method, in one example, the implementation of AES in counter mode comprises an implementation of AES-GCM (advanced encryption standard in Galois/counter mode).

In general with respect to the descriptions herein, in one example, a method includes: generating link protection for transmission of write data to memory devices, the write data having encrypted protected data and error checking and correction (ECC) data for the encrypted protected data; generating a link integrity tag associated with the link protection; and sending the write data with the link protection and the link integrity tag to the memory module to trigger the memory module to perform link integrity check with the link integrity tag and to store the protected data and ECC data in the memory devices.

In one example of the method, the method includes generating command and address link protection on command and address information to send to the memory devices, including generating a command and address link integrity tag associated with the command and address link protection. In accordance with any preceding example of the method, in one example, the link integrity tag comprises a message authentication code (MAC), wherein the I/O hardware is to send bits of the MAC over multiple data transfer cycles. In accordance with any preceding example of the method, in one example, the link integrity tag comprises a message authentication code (MAC), wherein the I/O hardware is to send bits of the MAC over a signal line separate from a data bus or a command and address bus. In accordance with any preceding example of the method, in one example, the protected data comprises data at rest protected with multikey total memory encryption (MKTME). In accordance with any preceding example of the method, in one example, the method includes performing link encryption on a new cryptographic key; and, after passing the new cryptographic key, applying the new cryptographic key for link encryption. In accordance with any preceding example of the method, in one example, the method includes encrypting the write data. In accordance with any preceding example of the method, in one example, the link encryption comprises an implementation of advanced encryption standard (AES) in counter mode. In accordance with any preceding example of the method, in one example, the implementation of AES in counter mode comprises an implementation of AES-GCM (advanced encryption standard in Galois/counter mode).

In general with respect to the descriptions herein, in one example, a method includes: receiving read data from memory devices, the read data having the link protection on encrypted protected data and error checking and correction (ECC) data for the encrypted protected data; receiving a link integrity tag associated with the link protection; and verifying the link protection with the link integrity tag.

In one example of the method, the protected data comprises data at rest protected with multikey total memory encryption (MKTME). In accordance with any preceding example of the method, in one example, the read data has link encryption, and further comprising decrypting the link encryption. In accordance with any preceding example of the method, in one example, the link encryption comprises an implementation of advanced encryption standard (AES) in counter mode. In accordance with any preceding example of the method, in one example, the implementation of AES in counter mode comprises an implementation of AES-GCM (advanced encryption standard in Galois/counter mode).

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory module, comprising:
multiple memory chips each having a link decryption engine;
a link decryption engine for each of the multiple memory chips, the link decryption engine to receive write data from a link encryption engine of a memory controller, the write data having encrypted protected data and error checking and correction (ECC) data for the encrypted protected data, the write data having link protection on the write data, the link decryption engine to further receive a link integrity tag associated with the link protection, wherein the link decryption engine is to perform link integrity check with the link integrity tag for an associated memory chip; and
wherein the link decryption engine includes circuitry for each of the multiple memory chips to perform the link integrity check with the link integrity tag for a specific memory chip, the multiple memory chips to store the encrypted protected data and ECC data from the link decryption engine.

2. The memory module of claim 1, wherein the circuitry of the link decryption engine comprises a link decryption chip as the link decryption engine for each of the multiple memory chips.

3. The memory module of claim 1, wherein the link protection comprises an implementation of advanced encryption standard with Galois message authentication code (AES-GMAC).

4. The memory module of claim 1, further comprising the write data to have link encryption, wherein the link decryption engine is to decrypt the link encryption for the write data.

5. The memory module of claim 4, wherein the link encryption comprises an implementation of AES-GCM (advanced encryption standard in Galois/counter mode).

6. The memory module of claim 4, further comprising:
a registering clock driver (RCD) to receive command and address information for the memory chips;
wherein the command and address information having the link encryption;
wherein the RCD includes a link decryption engine to decrypt the link encryption for the command and address information.

7. A memory module, comprising:
multiple memory chips to store encrypted protected data and error checking and correction (ECC) data for the encrypted protected data;
data buffers to buffer data for the multiple memory chips, with each data buffer uniquely associated with one of the multiple memory chips, the data buffers each having a link encryption engine;
a link encryption engine for each of the multiple memory chips, the link encryption engine to receive the encrypted protected data and error checking and correction (ECC) data for the encrypted protected data from the memory chips as read data, the link encryption engine to generate link protection for transmission of the read data to a link decryption engine of a memory controller for an associated memory chip, including to generate a link integrity tag associated with the link protection; and
I/O hardware to send the read data with the link protection and the link integrity tag to the memory controller;
wherein the link encryption engine of the data buffers includes circuitry for each of the multiple memory chips to generate the link integrity tag for a specific memory chip.

8. The memory module of claim 7, wherein the link protection comprises an implementation of advanced encryption standard with Galois message authentication code (AES-GMAC).

9. The memory module of claim 7, further comprising the link encryption engine to encrypt the read data.

10. The memory module of claim 9, wherein the link protection comprises an implementation of AES-GCM (advanced encryption standard in Galois/counter mode).

11. A memory controller comprising:
I/O (input/output) hardware to couple to a memory module having multiple memory chips; and
a link encryption engine to generate link protection for transmission of write data to the memory chips, the write data having encrypted protected data and error checking and correction (ECC) data for the encrypted protected data, including to generate a link integrity tag associated with the link protection;
wherein the I/O hardware is to send the write data with the link protection and the link integrity tag to the memory module; and
wherein the memory module is to perform link integrity check with a link decryption engine for each of the multiple memory chips with the link integrity tag and to store the protected data and ECC data in the memory chips;

wherein the link decryption engine for each of the multiple memory chips comprises a link decryption circuit on each of the multiple memory chips to perform the link integrity check with the link integrity tag locally for a specific memory chip.

12. The memory controller of claim 11, wherein the link encryption engine comprises a data link encryption engine, and further comprising:

a command and address link encryption engine to generate command and address link protection on command and address information to send to the memory chips, including to generate a command and address link integrity tag associated with the command and address link protection;

wherein the memory module includes a registering clock driver (RCD) to receive the command and address information for the memory chips with the command and address link protection and perform link integrity check with the command and address link integrity tag.

13. The memory controller of claim 11, wherein the link encryption engine is to perform link encryption on a new cryptographic key to the memory module, wherein after passing the new cryptographic key, the link encryption engine is to use the new cryptographic key for link encryption.

14. The memory controller of claim 11, wherein the memory controller includes the link encryption engine to encrypt the write data, wherein the link protection comprises an implementation of AES-GCM (advanced encryption standard in Galois/counter mode).

15. A memory controller comprising:

I/O (input/output) hardware to couple to a memory module having multiple memory chips; and a link decryption engine to verify link protection on read data received from the memory chips, the read data having the link protection on encrypted protected data and error checking and correction (ECC) data for the encrypted protected data generated by a link encryption engine for each of the multiple memory chips, the link decryption engine to verify the link protection with a link integrity tag associated with the link protection provided by the link encryption engine of each of the memory chips;

wherein the link encryption engine for each of the multiple memory chips comprises a link encryption circuit on each of the multiple memory chips to generate the link integrity tag locally for a specific memory chip.

16. The memory controller of claim 15, wherein the protected data comprises data at rest protected with multikey total memory encryption (MKTME).

17. The memory controller of claim 15, wherein the memory controller includes the read data to have link encryption, wherein the link decryption engine is to decrypt the link encryption.

18. The memory module of claim 9, further comprising:

a registering clock driver (RCD) to receive command and address information for the memory chips;

wherein the command and address information having the link encryption;

wherein the RCD includes a link decryption engine to decrypt the link encryption for the command and address information.

* * * * *